US009022575B2

(12) United States Patent
Hsu

(10) Patent No.: US 9,022,575 B2
(45) Date of Patent: May 5, 2015

(54) FLEXIBLE MOBILE DISPLAY

(75) Inventor: Feng-hsiung Hsu, Cupertino, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1078 days.

(21) Appl. No.: 13/070,336

(22) Filed: Mar. 23, 2011

(65) Prior Publication Data
US 2012/0244910 A1 Sep. 27, 2012

(51) Int. Cl.
| G03B 21/30 | (2006.01) |
| G03B 21/60 | (2014.01) |
| G03B 21/58 | (2014.01) |
| G03B 21/10 | (2006.01) |
| G03B 21/602 | (2014.01) |
| F21V 8/00 | (2006.01) |

(52) U.S. Cl.
CPC .............. *G03B 21/10* (2013.01); *G02B 6/0053* (2013.01); *G03B 21/58* (2013.01); *G03B 21/602* (2013.01)

(58) Field of Classification Search
CPC ...... G03B 21/58; G03B 21/602; G03B 21/62; G03B 21/625
USPC ......... 359/459, 450, 453, 454, 455, 460, 461; 353/72, 73, 75, 119, 122
See application file for complete search history.

(56) References Cited

U.S. PATENT DOCUMENTS

| 6,594,079 | B1 * | 7/2003 | Trott et al. ..................... 359/456 |
| 7,099,079 | B2 * | 8/2006 | Hibi et al. ...................... 359/460 |
| 7,852,556 | B2 * | 12/2010 | Huang et al. .................. 359/457 |
| 2010/0045569 | A1 | 2/2010 | Estevez et al. |
| 2010/0110386 | A1 | 5/2010 | Handschy et al. |
| 2010/0165303 | A1 * | 7/2010 | Murata et al. ................... 353/79 |

OTHER PUBLICATIONS

Darmon, et al., "70.1: LED-Illuminated Pico Projector Architectures", Retrieved at <<http://www.displaytech.com/pdf/sid_08_pico_proj_70-1.pdf>>, vol. 39, Issue 01, May 2008, pp. 1070-1073.
Kawsar, et al., "An Explorative Comparison of Magic Lens and Personal Projection for Interacting with Smart Objects", Retrieved at <<http://edcc.dependability.org/~rukzio/publications/mobilehci2010_kawsar.pdf>>, Sep. 7-10, 2010, pp. 4.
Evans, Mike, "Motorola to add projector displays to its mobile phones", Retrieved at <<http://mobilementalism.com/category/tech/page/2/>>, Jul. 25, 2007, pp. 10.

(Continued)

*Primary Examiner* — William C Dowling
*Assistant Examiner* — Ryan Howard
(74) *Attorney, Agent, or Firm* — Jeremy Snodgrass; Judy Yee; Micky Minhas

(57) ABSTRACT

In general, a "Flexible Mobile Display," as described herein, provides various techniques for implementing a flexible display for mobile phones or other handheld or portable electronic or computing devices that, in various embodiments, is foldable and/or rollable. Consequently, the Flexible Mobile Display provides a large display in a small form factor that is user extensible. Advantageously, production of the Flexible Mobile Display uses an adaptation of various currently available production techniques and is expected to be relatively low cost to produce. Additionally, in various embodiments, the Flexible Mobile Display also includes a low cost touch or multi-touch sensing mechanism that can be easily integrated into the overall system.

20 Claims, 13 Drawing Sheets

(56) References Cited

OTHER PUBLICATIONS

Evans, Mike, "3GSM 2007: Foldable screens a reality—video", Retrieved at <<http://mobilementalism.com/2007/02/18/3gsm-2007-foldable-screens-a-reality-video/>>, Feb. 18, 2007, pp. 8.

Bradford, Tiffany, "TV to Cell Phone + Pico Projector = Big Screen Experience from a Small Device!", Retrieved at <<http://www.microvision.com/displayground/?p=850>>, Jun. 9, 2009, pp. 7.

Freeman, et al., "Scanned Laser Pico projectors: Seeing the Big Picture (with a Small Device)s", Retrieved at <<http://www.microvision.com/pdfs/Scanned%20Laser%20Pico%20Projectors.pdf>>, vol. 20, Issue 05, Aug. 2009, pp. 8.

* cited by examiner

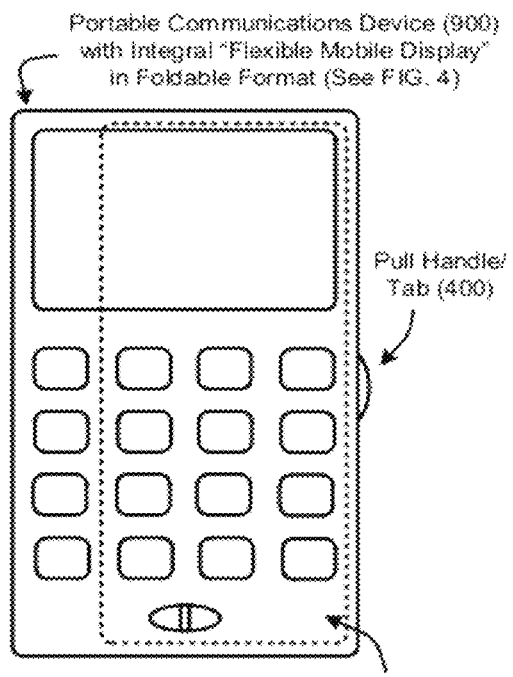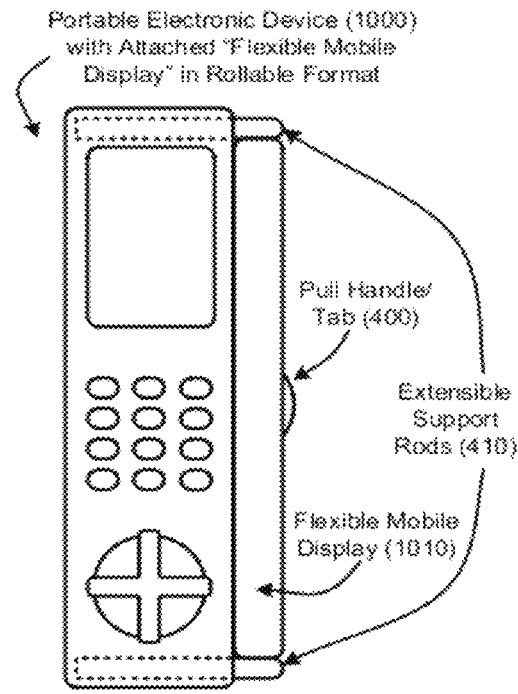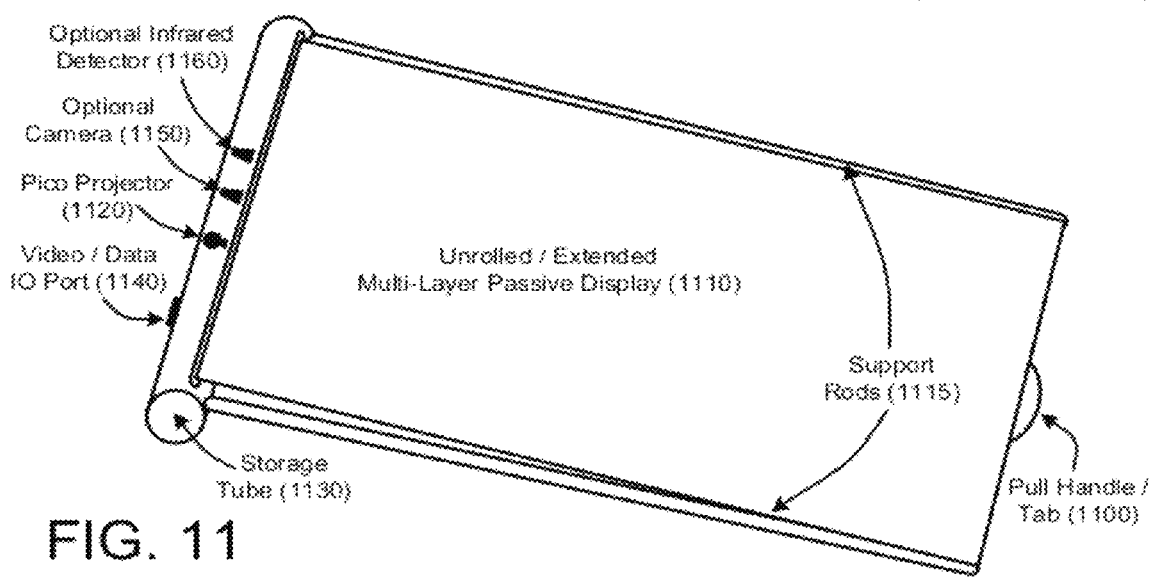

FLEXIBLE MOBILE DISPLAY

BACKGROUND

1. Technical Field

A "Flexible Mobile Display" provides a thin flexible display for mobile phones or other handheld or portable computing devices that is foldable and/or rollable without damaging optical characteristics of the flexible display in order to provide a large display in a compact user extensible form factor.

2. Related Art

One of the biggest complaints with today's mobile phones or other handheld or portable computing devices is the limited display size. Foldable displays have been suggested as one possible solution to this complaint. However, many proposed or prototype foldable display solutions may be impractical as the mechanical stress along folds may be too extreme to allow reliable operation over many folding cycles. Suggestions for rollable displays also have raised a number of potential problems. For example, most proposals for rollable displays use an active matrix in order to provide video capability. An active matrix, unfortunately, presents serious material issues for rollable displays as the transistors tend to fail under the repeated bending caused by rolling the displays.

In general, rollable displays can divided into emissive and reflective types. OLED is the main emissive type proposed. OLED has a number of problems. One of the most serious problems is that OLED cannot tolerate water vapor and require stringent hermetic sealing. For rollable OLED displays, this becomes a very difficult material issue to solve. OLED also has relatively low light emission efficiency when compared to inorganic LEDs. Combining with the fact that OLED is a Lambertian light emitter and do not have directional gain, rollable OLED displays will consume significant amounts of power, thereby limiting their utility for portable devices. Reflective rollable displays in general have lower hermetic sealing requirements than OLED and may be closer to reality than the OLED ones. The manufacturability and durability issues, however, remain, especially given the fact that almost all of them require active matrix driving. Also, for most of them, video rate operation and good color rendition remain unsolved issues.

As an alternative to active matrix type displays, there are a several passive matrix displays that can potentially be rollable, but suffer other problems. For example, one recent technology, which can be viewed as an electrophoretic display with an air medium, uses electret particles, particles with semi-permanent electric charges, and can achieve video rate for smaller matrices. This technology suffers from limited reflectivity, especially in color mode, restricted color gamut, and potential durability issues. Further, electret particles may suffer from charge loss from impacts with the electrodes. In addition, humidity changes have been known to affect the threshold voltage needed for proper passive matrix operation.

Another type of passive matrix display referred to as MEMS is bistable and offers limited gray scale capability. However, the color gamut is relatively small. Unfortunately, the technology of such displays is relatively immature and currently even manufacturing of a rigid version is still in the planning stages. As such while MEMS type displays may provide viable solutions in the future, no such displays in foldable or rollable formats are currently commercially available.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In general, a "Flexible Mobile Display," as described herein, provides various techniques for implementing a flexible display that, in various embodiments, is foldable and/or rollable, combined with an optical or laser-based micro or pico projector to provide a user extensible display for mobile phones or other handheld or portable computing devices. In various embodiments, a short-throw pico or micro projector is used to reduce size requirements of the Flexible Mobile Display since a short-throw projector can be placed much closer to a display screen than a conventional or long-throw projector. However, the use of a short-throw projector is not required. Because the Flexible Mobile Display is foldable and/or rollable, it can be implemented within a very small form factor using a variety of designs and configurations to provide an extensible display screen for use in mobile devices including, but not limited to, portable or mobile communications devices or cell phones, mobile gaming devices, mobile computing devices, eBooks, eReaders, remote control devices, etc.

The display screen of the Flexible Mobile Display is rollable and/or foldable, produces high contrast images in the native color range of the pico projector, provides optional directional gain, and can be easily manufactured. Further, by placing cameras or infrared detectors in a position to share the reverse of the optical path of the projector, the Flexible Mobile Display also provides both touch sensitivity on the display surface and/or limited imaging capabilities. Note also that a wavelength-selective beam splitter, such as, for example, a dichroic mirror, can be used in the optical path to direct particular frequency ranges of light inputs (e.g., visible and infrared) to particular devices, thereby allowing those devices to be offset from the direct optical path of the pico projector. Further, optional pressure-based or capacitive touch sensors can be added to the display surface of the Flexible Mobile Display as an alternative to infrared-based touch sensing.

Advantageously, production of the Flexible Mobile Display uses an adaptation of currently available production techniques and is expected to be relatively low cost to produce. Additionally, in various embodiments, the Flexible Mobile Display also includes a low cost touch or multi-touch sensing mechanism that can be easily integrated into the overall system (using a variety of sensing techniques, including, for example, infrared, pressure, capacitive, etc.). Further, another advantage of the Flexible Mobile Display is that it is small enough that it can easily be integrated into particular mobile devices, or can be coupled to existing devices via a wired or wireless video or data interface. Examples of wired interfaces include, but are not limited to VGA, DVI, HDMI, Display Port, IEEE 1394, Ethernet, etc. Examples of wireless interfaces include, but are not limited to, various 802.11 standards or other radio-frequency based interfaces.

In addition, because it is so small, prior to being extended for viewing purposes, the Flexible Mobile Display can be considered as a portable device by itself that can be coupled to any other portable device having appropriate interfaces for video, I/O and/or power, depending upon the specific implementation. Further, the screen or display of the Flexible Mobile Display (generally referred to herein as a "flexible multi-layer display" portion of the Flexible Mobile Display) is passive, such that only the associated projector requires power. Although, depending on the embodiment, the flexible multi-layer display may include some low-power electronics (e.g., capacitive-based touch detection). Consequently, the Flexible Mobile Display is also very energy efficient. Note that energy efficiency can come from several sources. For example, contrast improvement from the screen optics (e.g., via rejection of ambient light) and/or optical gain of the screen as a result of a narrow light output angle will both reduce energy requirements for displaying a high contrast image. Typical pico-projectors for projecting to arbitrary surfaces typically consume on the order of about 3 watts. However, one advantage of the Flexible Mobile Display is that when projecting onto the flexible multi-layer display portion of the Flexible Mobile Display, power requirements for the pico-projector are significantly reduced while achieving equivalent contrast levels.

In view of the above summary, it is clear that the Flexible Mobile Display described herein provides various techniques for implementing a flexible display for mobile phones or other handheld or portable computing devices that is foldable and/or rollable. In addition to the just described benefits, other advantages of the Flexible Mobile Display will become apparent from the detailed description that follows hereinafter when taken in conjunction with the accompanying drawing figures.

DESCRIPTION OF THE DRAWINGS

The specific features, aspects, and advantages of the claimed subject matter will become better understood with regard to the following description, appended claims, and accompanying drawings where:

FIG. 9 provides an example of a foldable embodiment of the Flexible Mobile Display integrated into a mobile device, as described herein.

FIG. 10 provides an example of a rollable embodiment of the Flexible Mobile Display coupled to a mobile device, as described herein.

FIG. 11 provides an example of a rollable embodiment of the Flexible Mobile Display, showing the display flexible multi-layer display portion in an extended position, as described herein.

DETAILED DESCRIPTION OF THE EMBODIMENTS

In the following description of the embodiments of the claimed subject matter, reference is made to the accompanying drawings, which form a part hereof, and in which is shown by way of illustration specific embodiments in which the claimed subject matter may be practiced. It should be understood that other embodiments may be utilized and structural changes may be made without departing from the scope of the presently claimed subject matter.

1.0 Introduction:

In general, a "Flexible Mobile Display," as described herein, provides various techniques for implementing a flexible display that, in various embodiments, is foldable and/or rollable, combined with an optical or laser-based micro or pico projector to provide a user extensible display for mobile devices, such as mobile phones or other handheld or portable computing devices. In various embodiments, a short-throw pico or micro projector is used to reduce size requirements of the Flexible Mobile Display since a short-throw projector can be placed much closer to a display screen than a conventional or long-throw projector. However, the use of a short-throw projector is not required, and a longer throw projector, in combination with one or more mirrors for directing the projection may be used in various embodiments. Note that the difference between short-throw projectors and regular or long-throw projectors is well known to those skilled in the art, and will not be described in detail herein.

The screen of the Flexible Mobile Display is a multi-layer passive display that works in combination with a pico projector or other small image projection device or mechanism to provide a high resolution display device to the user. This passive display screen will generally be referred to in the following discussion as a "flexible multi-layer display" or alternately as a "multi-layer passive display" portion of the Flexible Mobile Display. Depending upon the specific implementation of various embodiments of the Flexible Mobile Display, the overall thickness of the multi-layer screen is on the order of about 50 to 250 microns. For purposes of comparison, a human hair generally ranges from about 50 to 100 microns in diameter. Resolution of the Flexible Mobile Display is partially dependent upon the capabilities of the projector and the density of a micro-reflector array component of the multi-layer passive display, but can easily reach or exceed 250 DPI (dots per inch).

More specifically, the multi-layer passive display of the Flexible Mobile Display consists of several layers, some of those layers being optional. Further, two of the layers, which can be combined into one layer in various embodiments, are of particular interest: a "light redirection layer" and a "focusing layer".

Figure 1:
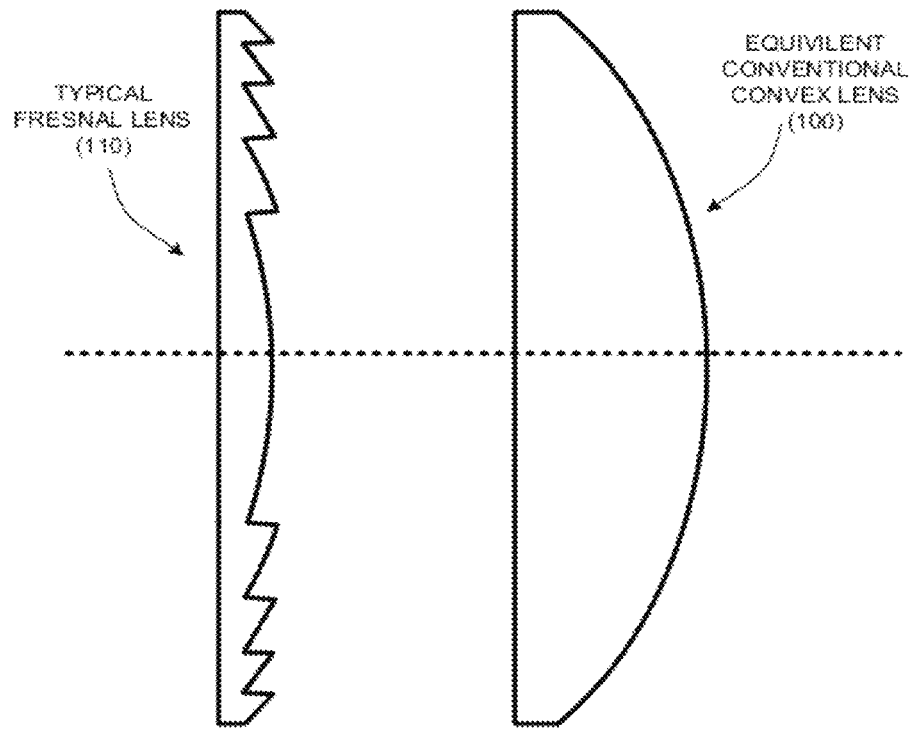
FIG. 1 illustrates a cross-sectional view of a typical Fresnel lens and a cross-sectional view of conventional plano-convex lens of equivalent power, as described herein.

The light redirection layer serves the function of redirecting light from the projector in the general direction of the user, with that light then being further directed and focused by a focusing layer. Note that while a conventional convex lens (e.g., element 100 of FIG. 1) may be used for redirecting light, a Fresnel lens (e.g., element 110 of FIG. 1) provides a significantly thinner lens for implementing the light redirection layer. In general, if a projector is at the left focus of the convex lens 100 in FIG. 1, the light output would be collimated in the horizontal direction to the right of the convex lens 100 in FIG. 1. Reflecting surfaces, such as, for example, micro-prisms or silvered micro-mirrors, or simply some material having an acceptable index of refraction, can also be used for light redirecting purposes in the light redirection layer.

The focusing layer serves to modify the viewing angle and, in various embodiments, to reject ambient light from sources other than the projector. Micro-lens arrays or micro-mirror arrays can both used for this purpose (all such embodiments in the focusing layer are generally referred to below as an "array of micro-reflectors" or as a "micro-reflector array"). In general, gap-free implementations of either such type of array will maximize light output relative to a similar array having gaps in the array field. However, a gap-free micro-lens or micro-reflector array is not necessarily needed if the incoming light has a sufficiently large incidence angle with respect to the array, as shadows from the lens/mirrors would cover the gaps. Depending upon the geometry used, this case may exist when using a short throw projector. Further, by using such geometry, construction of the flexible multi-layer display portion of the Flexible Mobile Display is simpler since a gapped array is much easier to construct than a gap-free array. In fact, an array with gaps can be made by methods, such as, for example, by using ink-jet printing technologies adapted to "print" arrays of melted polymer droplets on a flat surface, for instance, thereby creating a gapped array of lenses.

As far as array geometry, the array can, for instance, be hexagonal, rectangular, concentric, or any other desired patterning. Note that a concentric formation of array elements is typically used when the light redirection layer and the focusing layer are combined into a single layer. However, it should be appreciated that a variety of array geometries can be used to achieve particular effects. As noted above, in various embodiments, to improve the rejection of ambient light, a self-alignment lithographic step is applied to construct a focus plane on top of the focusing layer. In general, as discussed in further detail below (with respect to FIG. 2), this self-alignment step uses light from the projector to expose optically sensitive material on the focus plane such that transparent regions are etched into an otherwise opaque focus plane.

In various embodiments, a transparent layer is placed on top of the focusing layer to provide spacing for the aforementioned "focus plane" that sits at a proper distance from the micro-reflector array of the focusing layer so that holes or transparent regions of the otherwise opaque focus plane correspond to a focal point of each of the micro-reflectors in the focusing layer. In other words, the focal points will coincide with the surface comprising focus plane (rather than being above or below the focus plane) due to the spacing provided by the transparent layer. Finally, an optional transparent protective layer sits on top of the focus plane. Note also that the focus plane can simply be a top surface of the otherwise transparent layer that sits on top of the focusing layer, rather than a separate layer. FIG. 2 through FIG. 5 (discussed in Section 1.1) illustrate various alternate embodiments showing different combinations and orders of layers for implementing the multi-layer passive display of the Flexible Mobile Display. Further, FIGS. 14 and 15, discussed in Section 2.7, illustrate alternate implementations of the Flexible Mobile Display that show how similar components can be used in significantly different ways to implement various embodiments of the Flexible Mobile Display.

Once the multi-layer passive display of the Flexible Mobile Display has been constructed, a projector projects images and/or videos onto the bottom side of the light redirection layer (either directly, or via a mirror, depending upon the particular embodiment). Light entering the bottom of the light redirection layer is first redirected upwards, in the general direction of the viewer, and into the micro-reflector array of the focusing layer. Light then exits the focusing layer, and travels through the transparent layer and then through corresponding transparent regions or holes in the focus plane. Light exiting the focus plane then becomes visible to the user on the top surface of the multi-layer passive display as each light ray exits the focus plane. Note also that transparent or protective films can be placed on, or between, any of the layers of the display, if desired.

In additional embodiments, discussed in further detail below, various enhancements are made to one or more layers of the multi-layer passive display of the Flexible Mobile Display. For example, one such enhancement involves making a backside surface of the micro-reflectors non-reflective such that stray light rays from unwanted sources or directions that strike the backside of a micro-reflector will not be inadvertently further reflected onto the front surface of a neighboring micro-reflector. The result of this enhancement is that unwanted or unexpected light rays from any source or direction other than the projector are less likely to be transmitted through the focus plane so as to be visible to the user and thereby potentially corrupting one or more "pixels" or dots of the display surface provided by the focus plane.

As noted above, the Flexible Mobile Display includes a flexible multi-layer passive display that is on the order of about 50 to 250 microns thick. However, it should be understood that the flexible multi-layer passive display of the Flexible Mobile Display can be either thinner or thicker than the stated range, if desired, and depending upon the materials used and the thickness of various layers of the display. The obvious result of this is that thinner displays will tend to be both more flexible and potentially more fragile, and thicker displays will tend to be stiffer and less fragile, though both of these cases depend upon the specific materials being used to construct the multi-layer passive display of the Flexible Mobile Display.

More specifically, potential stress related fractures and damage caused by repeated bending or rolling of the flexible multi-layer passive display may tend increase as the thickness of the display is either increased or decreased, depending upon the specific materials used to fabricate the Flexible Mobile Display. In any case, it should be understood that since the flexible multi-layer display portion of the Flexible Mobile Display is passive, with no moving parts or electronics (in most embodiments, as discussed in further detail below), the flexible multi-layer passive display of the Flexible Mobile Display will continue to operate, potentially with some amount of degradation, even with relatively significant damage, assuming that the attached projector remains functional and in a correct relative alignment to the flexible multi-layer passive display.

Another enhancement, discussed in further detail below, involves using a camera and/or infrared sensor placed near the projector to capture light in the visible or infrared range traveling along (or approximately along) the reverse path taken by light projected from the projector. Note that a wavelength-selective beam splitter, such as, for example, a dichroic mirror or other device, can be used in the optical path to direct particular frequency ranges of light inputs (e.g., visible and infrared) to particular devices (e.g., an infrared sensor), thereby allowing those devices to be offset somewhat from the direct optical path of the pico projector. These enhancements enable numerous applications, from touch or multi-touch applications to basic camera functionality (for objects on or very near the viewing surface of the flexible multi-layer passive display. For example, either or both the camera or infrared detector can be used to identify the specific positions and motions of a user touch on the top surface of the multi-layer passive display of the Flexible Mobile Display, thus enabling any of a number of touch and multi-touch based applications. Note that such touch-based applications can be enabled using the user fingers or other pointing devices such as a pen or stylus.

Further, placing a camera in the reverse optical path of the projector enable the Flexible Mobile Display to capture images of objects on or very near the viewing surface of the multi-layer passive display of the Flexible Mobile Display based on light rays reflected from those objects that then travel through the focus plane and thus impinge on the optional camera. While the optical resolution of such images is not expected to be on par with a typical digital SLR camera, the resolution will be sufficient to capture images with relatively high resolution. In fact, it is expected that the resolution will be sufficient to allow applications such as text recognition, bar-code reading, document scanning, etc.

Also, it is important to note that both touch-based applications and camera-based applications can operate concurrently with a projection of images or video being displayed on the multi-layer passive display of the Flexible Mobile Display without the touch, camera, or projection functionality interfering with each other.

Finally, it should clear that the exemplary applications noted above are but a few of the many applications enabled by Flexible Mobile Display, as described in further detail below.

Figure 2:
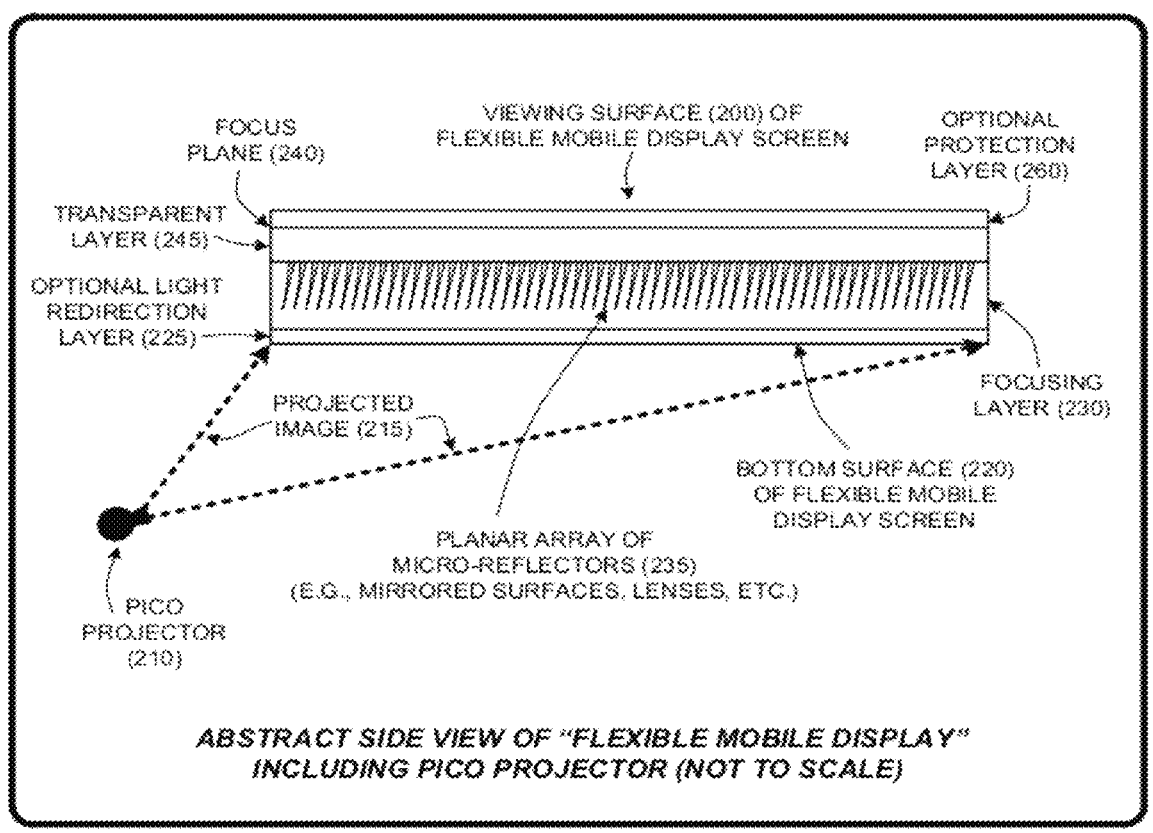
FIG. 2 illustrates an abstract cross-sectional side view of a flexible multi-layer display portion of a "Flexible Mobile Display," showing a micro-reflector array based implementation, as described herein.

1.1 System Overview:

As noted above, the "Flexible Mobile Display," provides various techniques for implementing a flexible display that, in various embodiments, is foldable and/or rollable, combined with an optical or laser-based pico or micro projector to provide a user extensible display for mobile phones or other handheld or portable electronic or computing devices. Several of the embodiments and processes summarized above are illustrated by the general system diagram of FIG. 2. In particular, the system diagram of FIG. 2 illustrates an abstract cross-sectional side view of the multi-layer passive display portion of the Flexible Mobile Display, as described herein. Furthermore, while the system diagram of FIG. 2 illustrates a high-level view of various embodiments of the Flexible Mobile Display, FIG. 2 is not intended to provide an exhaustive or complete illustration of every possible embodiment of the Flexible Mobile Display as described throughout this document.

In general, as illustrated by FIG. 2, a display portion of the Flexible Mobile Display consists of several layers, with a topmost layer or "viewing surface" 200 providing a projected image 215 and/or video from a micro or pico projector 210. The projector 210 projects images or video onto a transparent bottom surface 220 of the Flexible Mobile Display. The bottommost layer of the Flexible Mobile Display is either an optional light redirection layer 225 followed by a focusing layer 230, or simply the focusing layer alone.

The focusing layer 230 is comprised of a transparent material that includes an integral planar array of micro-reflectors 235 that act to passively focus light rays impinging on each reflector in the array onto a focus plane 240. Depending upon the positioning of the projector 210, and thus the incoming angle of light from the projector, the micro-reflectors 235 may or may not be sufficient to direct the light rays to desired positions on the focus plane 240. Consequently, the choice of whether or not to include the optional light redirection layer 225 is based on whether the focusing layer 230 is capable of bending the light at a steep enough angle to pass the light from the projector 210 to the desired locations on the focus plane 240.

In the case that the optional light redirection layer 225 is used, it serves to redirect incoming light rays from the projector 210 to an angle that is better suited to allow the micro-reflectors 235 to direct that incoming light to the desired positions on the focus plane 240. Note that there is some inherent amount of refraction that occurs naturally as the image from the projector moves from air into the transparent material used to construct the reflector layer 230. In some cases, depending upon the geometry of the component placement and the amount of natural refraction, this natural refraction may be sufficient to eliminate the need for the light redirection layer 225. See Section 2.5, and the associated discussion of FIG. 12 and FIG. 13 for a further discussion of these concepts.

A transparent layer 245 is placed on top of the focusing layer 230 to provide spacing for the focus plane 240 that sits at a proper distance from the array of micro-reflectors 235 so that holes or transparent regions of the focus plane correspond to a focal point of each of the micro-reflectors in the focusing layer 230. Note that the array of micro-reflectors 235 and various features on the screen are constructed with a higher resolution than the desired display resolution. Typically, acceptable resolution results are achieved when the density of the array of micro-reflectors 235 and various features on the screen are on the order of about a factor of two higher, though improved results are seen as this ratio increases. For example, assuming the array of micro-reflectors 235 has a 50-micron pitch, then the effective DPI for the display would be 250 DPI max, assuming a 2:1 ratio.

Note that alignment of the focus plane 240 to the focal points of the array of micro-reflectors 235 is achieved by first constructing the planar array of micro-reflectors, then coupling the transparent layer 245 and an opaque focus plane (or simply the transparent layer with an opaque surface layer) to the focusing layer 230. Photo-etching of the focus plane 240 is then performed by exposing the focus plane to light from a light source or laser from the approximate position where the projector 210 will be placed. This ensures that each of the holes of transparent regions of the focus plane 240 will match a corresponding focal point from one of the micro-reflectors 235 in the array. A further advantage of this type of self-alignment optical etching is that it significantly improves the contrast of images and videos displayed on the screen since the opaque areas of the screen tend to block unwanted light rays from sources other than the projector. As noted above, these transparent regions correspond to focal points of the focus plane. Generally, these transparent regions of the focus plane make up around 10% or less of the otherwise opaque focus plane. Note that ambient light rejection is improved as the percentage of transparent to opaque regions of the focus plane increase. For example, a focus plane having 1% transparent regions will reject more ambient light than a focus plane having 10% transparent regions.

Note also that, if desired, the focus plane 240 can be constructed to allow for two or more focal points (of the array of micro-reflectors 235 of the focusing layer 230) to exist within a single transparent region of the focus plane. In this case, there will be fewer transparent regions than micro-reflectors 235, and the overall resolution of the Flexible Mobile Display will be decreased. Further, due to slight differences or imperfections in the micro-reflectors 235, the corresponding transparent regions of the focus plane 240 are not expected to be perfectly symmetrically distributed. However, at resolutions on the order of about 250 DPI, any non-symmetry in the transparent regions of the focus plane 240 resulting from slight differences or imperfections in the micro-reflectors 235 will be very difficult for the unaided human eye to detect.

Note that other etching or material removal techniques may be performed to construct the focus plane 240, but that photo-etching for other purposes is a widely used technique that that can be easily adapted to construct the focus plane described herein while allowing the focal points of the array of micro-reflectors 235 of the focusing layer 230 to directly match the corresponding transparent regions of the focus plane 240.

Finally, to complete the multi-layer passive display portion of the Flexible Mobile Display, an optional transparent protection layer 260 is coupled or bonded to the top of the focus plane 240. In general, the purpose of the optional protection layer 260 is to protect the focus plane 240 from scratches or other damage. Further, in various embodiments, the transparent protection layer 260 may include capacitive touch-sensing capabilities to serve the double purpose of protection and touch sensing. However, as noted above, and discussed in further detail in Section 2.6, touch sensing can be provided on the surface of the passive display portion of the Flexible Mobile Display using optical and/or infrared methods that make use of the reverse of the optical path followed by light rays emanating from the projector 210.

Once the multi-layer passive display of the Flexible Mobile Display has been constructed using the various layers described above, the projector 210 projects an image 215 and/or videos onto the transparent bottom surface 220 of the Flexible Mobile Display. Light entering the bottom surface 220 is then redirected towards by the light redirection layer 225 towards the array of micro-reflectors 235 of the focusing layer 230. That light is then reflected upwards by the array of micro-reflectors 230 through the transparent layer 245 and then through corresponding transparent regions or holes in the focus plane 240, where it becomes visible to the user on the top or viewing surface 200 of the Flexible Mobile Display as each light ray exits the focus plane.

Figure 3:
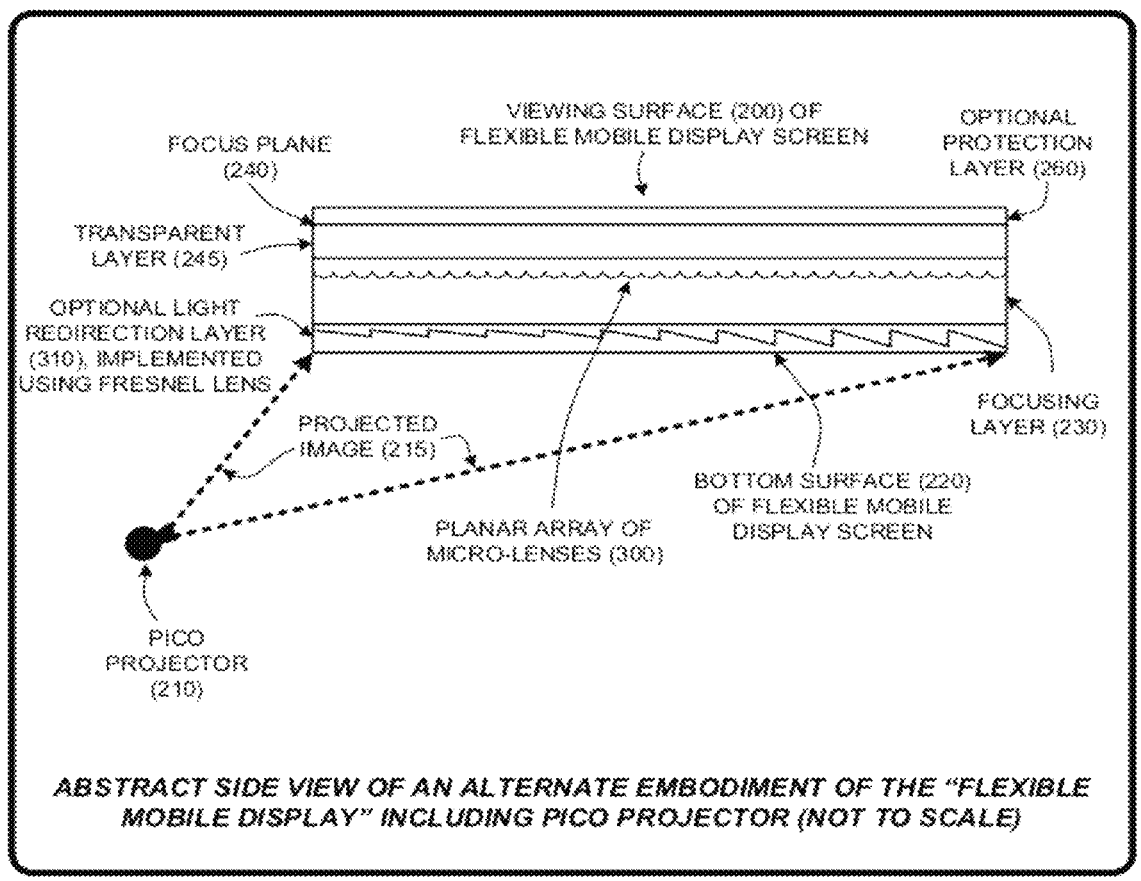
FIG. 3 illustrates an abstract cross-sectional side view of an alternate embodiment of the flexible multi-layer display portion of the "Flexible Mobile Display," showing a micro-lens array based implementation, as described herein.

The system diagram of FIG. 3 illustrates an abstract cross-sectional side view of an alternate implementation of the multi-layer passive display portion of the Flexible Mobile Display, as described herein. Furthermore, while the system diagram of FIG. 3 illustrates a high-level view of various embodiments of the Flexible Mobile Display, FIG. 3 is not intended to provide an exhaustive or complete illustration of every possible embodiment of the Flexible Mobile Display as described throughout this document.

In particular, similar to FIG. 2, FIG. 3 shows an optional light redirection layer 310, which unlike the embodiment of FIG. 2, is implemented using a Fresnel lens. As noted above, a Fresnel lens can provide approximately equivalent focusing capabilities as a traditional lens, though in a significantly thinner form factor. As with the light redirection layer 235 of FIG. 2, the light redirection layer 310 of FIG. 3 performs the function of redirecting incoming light rays from the projector 210 to an angle that is better suited to allow the focusing layer 230 to direct that incoming light to the desired positions on the focus plane 240. However, while the focusing layer 230 of FIG. 3 performs the same function as the focusing layer 230 of FIG. 2, in the embodiment of FIG. 3, the focusing layer 230 is implemented using a planar array of micro-lenses 300. The remaining elements of FIG. 3, including the transparent layer 245, the focus plane 240, the optional protection layer 260, and the viewing surface 200 perform the same functions in the same manner as described with respect to FIG. 2, and use the same reference numbers for that reason.

2.0 Operational Details of the Flexible Mobile Display:

The above-described elements are employed for implementing various embodiments of the Flexible Mobile Display. As summarized above, the Flexible Mobile Display provides various techniques for implementing a flexible display that, in various embodiments, is foldable and/or rollable, combined with an optical or laser-based pico or micro projector to provide a user extensible display for mobile phones or other handheld or portable electronic or computing devices. The following sections provide a detailed discussion of the operation of various embodiments of the Flexible Mobile Display, and of exemplary methods for implementing the elements described in Section 1 with respect to FIG. 2 and FIG. 3. In particular, the following sections provides examples and operational details of various embodiments of the Flexible Mobile Display, including: an operational overview of the Flexible Mobile Display; an exemplary foldable and rollable embodiments of the Flexible Mobile Display; examples of the Flexible Mobile Display in use with various mobile devices; optional directional light rejection and optical gain; an exemplary operational discussion of various embodiments of the flexible display screen; the addition of touch-based interfaces to the Flexible Mobile Display; and alternate implementations of the Flexible Mobile Display.

2.1 Operational Overview:

The need to have display physics, electrical connections and switches that are flexible is the fundamental reason why flexible displays having active electronics are so hard to realize and manufacture. Flexible projection screens, on the other hand, have been in existence for decades. Making flexible optics is a much simpler problem than solving the flexible display issues. Pico-projector modules have dropped to a cost of around $50 each, and are expected to drop further in cost. This makes integrating a pico-projector with an associated screen on a mobile device a highly attractive solution, so long as such a system consumes low power and provides a high contrast image. Preferably, such a system should also provide good multi-touch sensing capability. Unfortunately, no known conventional display screen currently in existence satisfies these criteria. On the other hand, the Flexible Mobile Display, as described herein is capable of satisfying these criteria and more.

Pico-projectors on market today consume too much power for use as the principal display for cell phones. The main reason is the low contrast achieved with typical reflecting surfaces such as white wall or paper. One way to reduce the power consumption is to increase the "gain" for the screen, namely, reduce the viewing angle. Further improvements can be achieved by making the screen reject and/or absorb ambient light. Combining both ideas can reduce the power consumption of the pico-projector, and thus the Flexible Mobile Display, by a factor of up to a hundred.

Projection systems can be divided into the front projection and the rear projection types. For mobile devices with touch screens, the rear projection type is preferable so as to not interfere with the projected image when the user is interacting with the display. In various embodiments, the Flexible Mobile Display provides a rear projection system that uses an enclosure-free rear projection system to reduce weight and mechanical complexity. However, the projector and optional camera or infrared detector may be housed within an enclosure, if desired.

Figure 4:
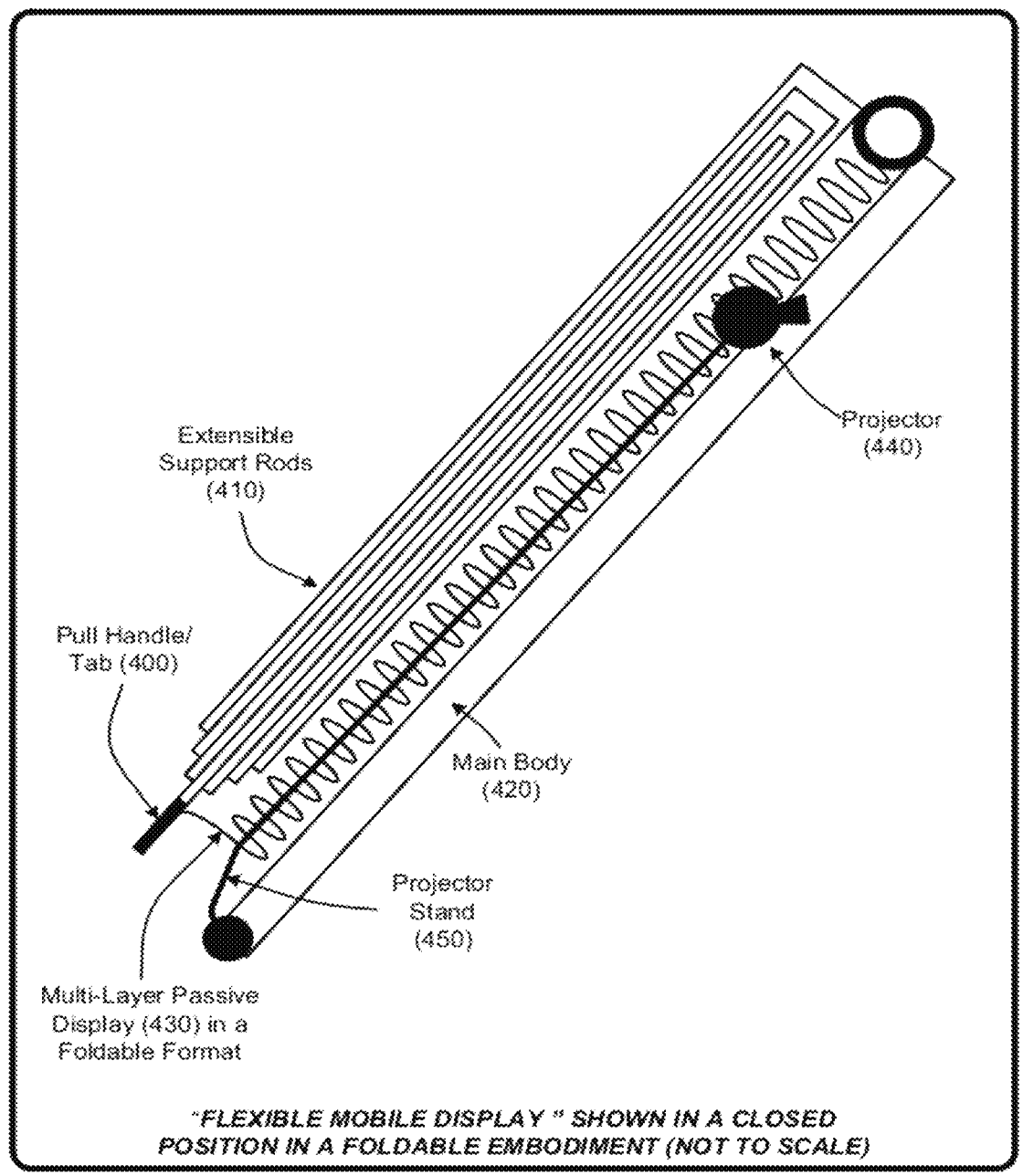
FIG. 4 provides an exemplary architectural view of a foldable and extensible embodiment of the Flexible Mobile Display, shown in a closed position, as described herein.

2.2 Exemplary Foldable and Rollable Embodiments:

FIG. 4 shows an exemplary abstract architectural view of a foldable and extensible embodiment of the Flexible Mobile Display, viewed from the side, shown in a closed position or condition. More specifically, FIG. 4 illustrates a pull handle 400 or tab and extensible support rods 410 that are part of a retractable support mechanism for a multi-layer passive display 430 portion of the Flexible Mobile Display that is implemented in a foldable format. Note that the pull handle 400 or tab are provided for ease of operation and are therefore considered as an optional component of the Flexible Mobile Display. The extensible support rods 410 are similar to a scaled down version of a telescoping handle/rod system that extends from a typical carry-on type of luggage. The support rods 410 are coupled to a main body 420 via a hinge or other attachment type that allows the Flexible Mobile Display to be folded into a relatively small form factor when not in use, as shown. Note that the embodiment shown in FIG. 4 is not intended to limit the use of the Flexible Mobile Display to the precise form illustrated, and that this embodiment is provided only as one of many examples of methods for placing the Flexible Mobile Display into a compact user extensible form factor.

In the embodiment illustrated, the multi-layer passive display 430 portion of the Flexible Mobile Display is shown in a folded condition while the Flexible Mobile Display is in the closed position. Note that while an accordion or pleated type fold for the multi-layer passive display 430 is illustrated in FIG. 2, any type of fold can be used for this purpose, though folds should not be so sharp as to crease or damage the multi-layer passive display. In operation, as the pull handle 400 is used to extend the support rods 410 to their fullest position, the multi-layer passive display 430 portion of the Flexible Mobile Display will unfold, extend and flatten. Further, a projector 440 is coupled to a projector stand 450 that folds out to a fixed position when the Flexible Mobile Display is to be used. The multi-layer passive display 430 will then automatically return to the folded condition when retracting the support rods 410. Note that as is well known to those skilled in the art, various materials are capable of shape memory. Some of these types of materials automatically return to a default state or shape (e.g., a folded state) when tension is removed from the material. This is the case with this embodiment of the multi-layer passive display 430 when retracting the support rods 410, which removes tension from the multi-layer passive display, thereby allowing the multi-layer passive display to automatically return to its folded state as the extensible support rods are retracted.

Figure 5:
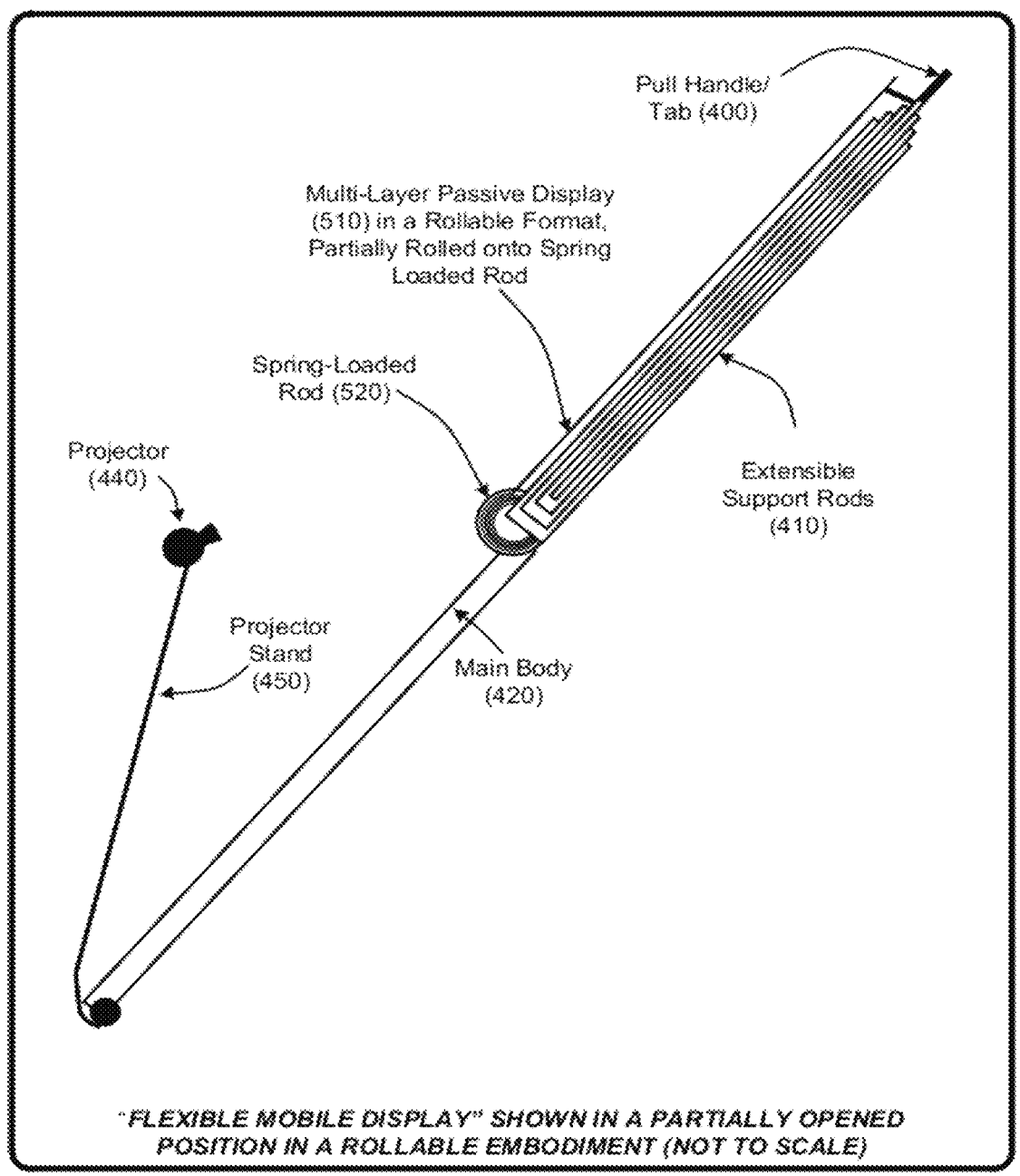
FIG. 5 provides an exemplary architectural view of a rollable and extensible embodiment of the Flexible Mobile Display, shown in a partially open position, as described herein.

FIG. 5 illustrates a similar embodiment of the Flexible Mobile Display, where the primary difference between FIG. 4 and FIG. 5 is that in FIG. 5, a multi-layer passive display 510 portion of the Flexible Mobile Display is provided in a rollable format, rather than the foldable format illustrated in FIG. 4. In FIG. 5, the Flexible Mobile Display is shown in a partially opened position, with the projector stand 450 having been folded out to its fixed position for use. Further, the support rods 410 have been folded out or rotated relative to the main body 420, but not yet extended. In this example, as the support rods 410 are extended, the multi-layer passive display 510 portion of the Flexible Mobile Display will unroll from a spring-loaded rod 520 or axis around which the multi-layer passive display is wrapped or wound.

Note that in various embodiments, the multi-layer passive display 510 is either wrapped around the spring-loaded axis 520 or rod without any additional protection, or, alternately, the spring-loaded axis or rod with the wrapped multi-layer passive display is enclosed in a storage tube or the like (not shown) having a slot that allows the multi-layer passive display to extend from the tube as the support rods 410 are extended. Not also that rather than being spring-loaded, in various embodiments, the rod 520 or axis about which the multi-layer passive display 510 is wound can be equipped with a handle or the like (not shown) to allow manual rewinding or retraction of the multi-layer passive display when not in use. This embodiment allows operation without the use of a spring-loaded rod, as well as operation in the event of a failure of the spring component of the spring-loaded rod 520.

Figure 6:
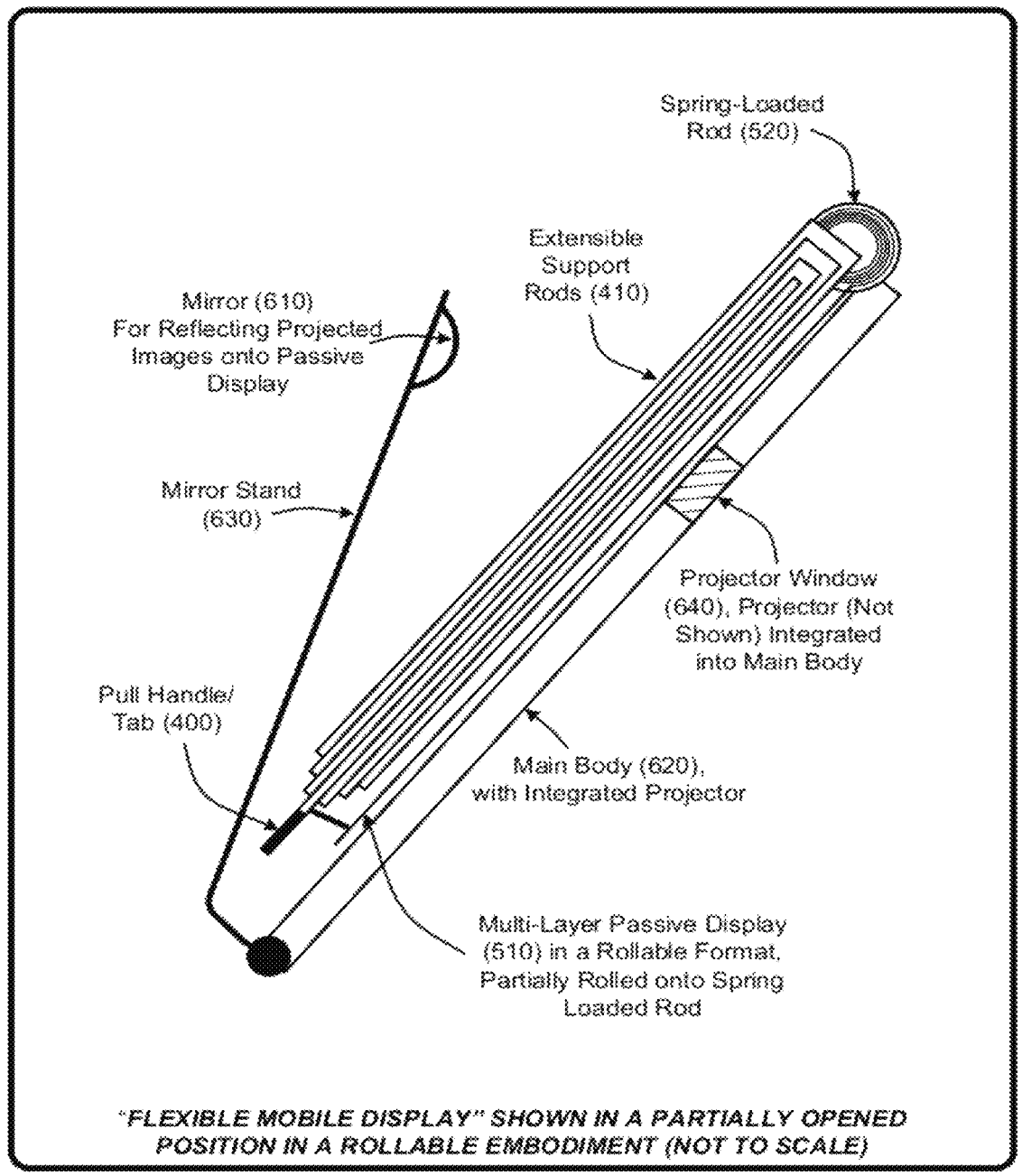
FIG. 6 provides an exemplary architectural view of an alternate embodiment of a rollable and extensible embodiment of the Flexible Mobile Display, shown in a partially open position, as described herein.

FIG. 6 provides another exemplary abstract architectural view of an alternate embodiment of a rollable and extensible embodiment of the Flexible Mobile Display, shown in a partially open position, as described herein. In general, the embodiment of FIG. 6 is similar to the embodiment described with respect to FIG. 5. However, one primary difference between these embodiments is that in the case of FIG. 6, a mirror 610 or reflective lens is provided in place of the projector illustrated in FIG. 5. Similar to the projector of FIG. 5, the mirror of FIG. 6 is coupled to a mirror stand 630 that folds out to a fixed position when the Flexible Mobile Display is to be used.

In this case, a projector (not shown) is housed within a main body 620 of the Flexible Mobile Display. The main body 620 illustrated in FIG. 6 differs from the corresponding component in FIG. 5 in that the main body 620 includes a projector window 640 that allows the integral projector to project through the surface of the main body onto the mirror 610. The mirror 610 then reflects that projection onto the multi-layer passive display 510 similar to the manner in which the projector of FIG. 5 directly projects onto the multi-layer passive display. One advantage of this embodiment over that of FIG. 5 is that the projector is enclosed in the main body 620, and thus better protected than is the case with the exposed projector of FIG. 5.

The remaining components of the Flexible Mobile Display illustrated in FIG. 6, including the pull handle 400, the extensible support rods 410, and the spring-loaded rod 520 perform the same functions in the same manner as described with respect to FIG. 5, and use the same reference numbers for that reason.

Figure 7:
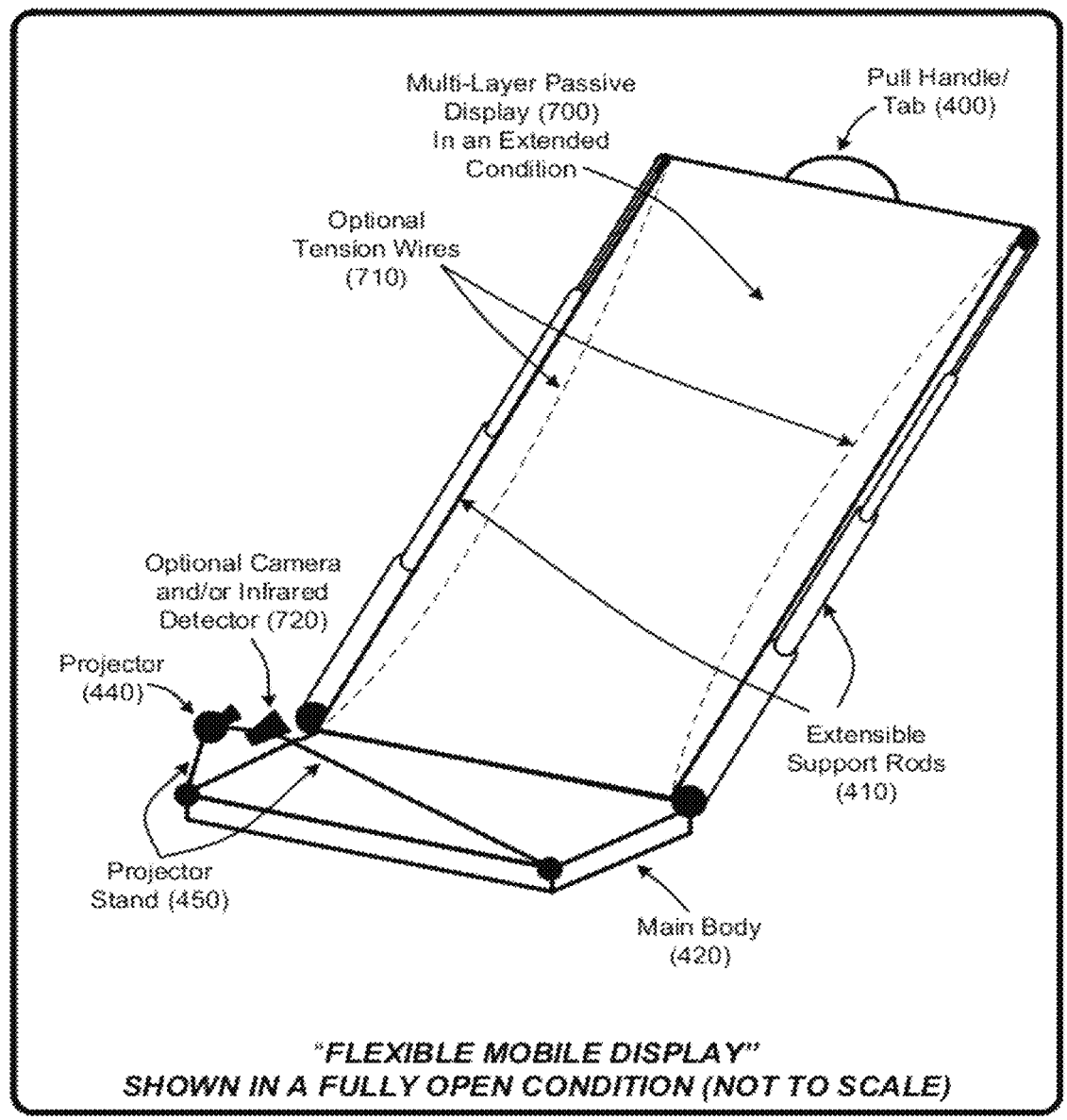
FIG. 7 provides an exemplary architectural view of an extensible embodiment of the Flexible Mobile Display, shown in a fully open condition, as described herein.

FIG. 7 provides an example of an embodiment of the Flexible Mobile Display that is similar to both FIG. 4 and FIG. 5. In this case, the Flexible Mobile Display is shown from the bottom, in a fully open condition, ready for use, along with several optional components, as discussed below.

More specifically, in the example of FIG. 7, the multi-layer passive display 700 (either foldable or rollable in this example) is shown in a fully extended condition. The extensible support rods 410 are also shown in a fully extended position. Note that when extended, the multi-layer passive display of either FIG. 4 or FIG. 5 (i.e., elements, 430 and 510, respectively) will assume a similar position and configuration to that of the multi-layer passive display 700 illustrated in FIG. 7. Consequently, FIG. 7 does not specifically illustrate a foldable or rollable embodiment of the Flexible Mobile Display, since this figure is intended to show the configuration of various embodiments of the Flexible Mobile Display in a fully open condition. As with FIG. 5, FIG. 7 also illustrates the projector stand 450 having been folded out to its fixed position for use.

Further, in this example, the projector stand 450 also includes and supports an optional camera and/or infrared detector 720. As noted above, by placing a camera or infrared detector 720 to make use of the reverse optical path of the projector, optical and/or infrared touch or multi-touch based functionality can be implemented within the Flexible Mobile Display. Further, the use of a camera placed to make use of the reverse optical path of the projector allows the multi-layer passive display 700 to act as a lens for that camera, thereby allowing concurrent operation of the Flexible Mobile Display as both a display device and a camera.

However, as noted above, use of the multi-layer passive display as a lens for the camera allows the Flexible Mobile Display to only capture images of objects on or very near the viewing surface of the multi-layer passive display of the Flexible Mobile Display. Consequently, such embodiments are useful for purposes such as, for example, such as text recognition, bar-code reading, document scanning, etc. Note that in order to capture high-quality images of more distant objects, an optional front facing camera (not shown) can be integrated into any of the embodiments described herein. The use of a front facing camera enables additional functionality, such as, for example, two-way video chat (depending on the functionality of the underlying electronic device making use of the Flexible Mobile Display).

Finally, FIG. 7 illustrates the use of optional tension wires 710 that are used to keep the unrolled or unfolded multi-layer passive display 410 properly tensioned and therefore sufficiently flat. Note also that tension wires, or other types of tensioning devices, such as, for example, flexible tensioning rods, can be used with any of the above described embodiments, including the embodiments of FIG. 4, FIG. 5, and FIG. 6.

Figure 8:
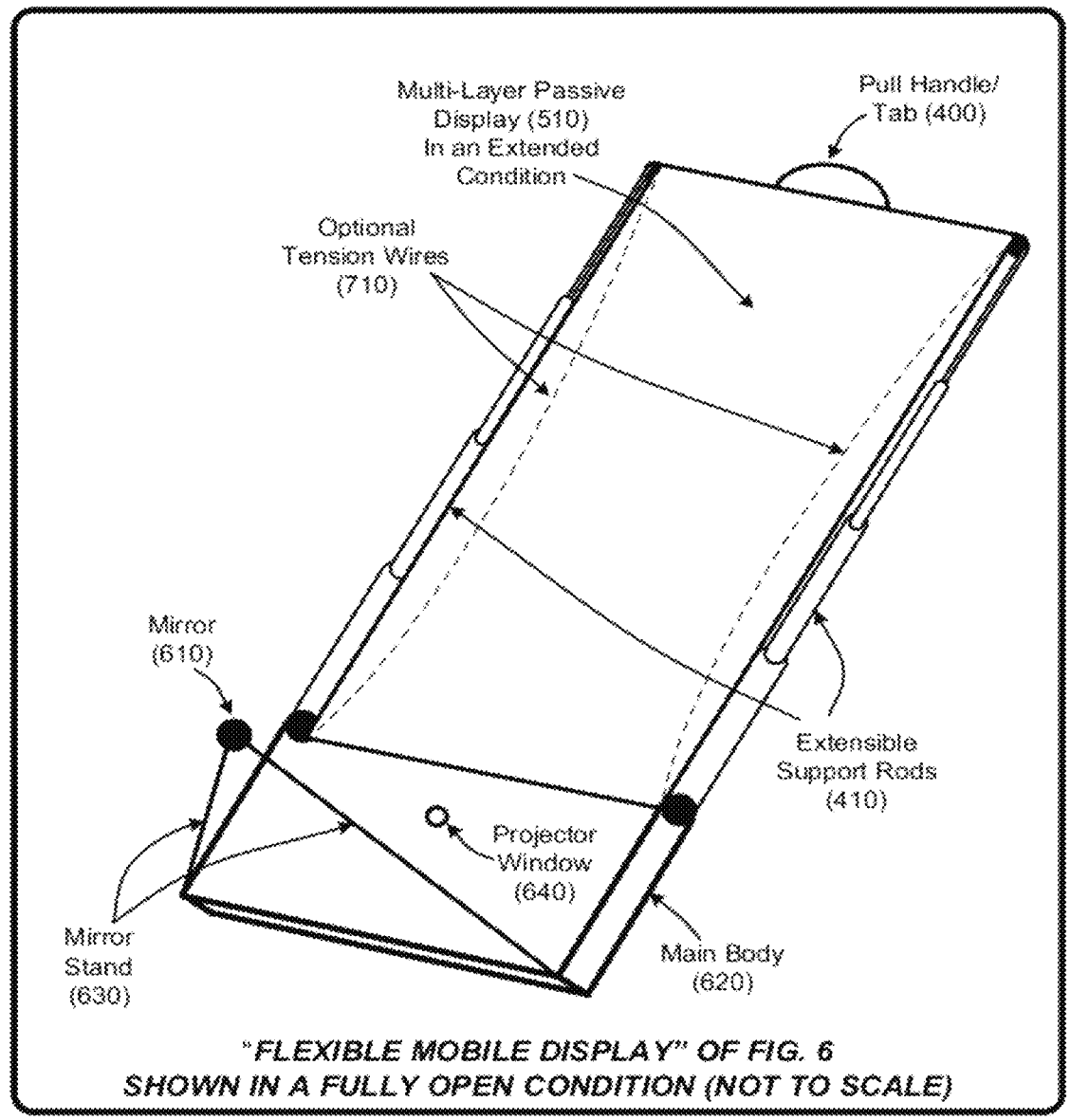
FIG. 8 provides an exemplary architectural view of the extensible embodiment of the Flexible Mobile Display of FIG. 6, shown in a fully open condition, as described herein.

Similar to FIG. 7, FIG. 8 provides an exemplary architectural view of another extensible embodiment of the Flexible Mobile Display, shown in a fully open condition. In this case, FIG. 8 shows the Flexible Mobile Display of FIG. 6 in a fully open condition, ready for use, along with several optional components, as discussed below. In general, the embodiment of FIG. 8 shows the mirror 610 or reflective lens disposed on the mirror stand 630 extended into position for reflecting a projection from a projector (not shown) housed within the main body 620 of the Flexible Mobile Display. As discussed with respect to FIG. 6, the main body 620 includes a projector window 640 that allows the integral projector to project through the surface of the main body onto the mirror 610. The mirror 610 then reflects that projection onto the bottom side of the multi-layer passive display 510, as discussed above.

The remaining components of the Flexible Mobile Display illustrated in FIG. 8, including the pull handle 400, the extensible support rods 410, and the optional tension wires 710 perform the same functions in the same manner as described with respect to FIG. 4 and FIG. 7, and use the same reference numbers for that reason.

2.3 Examples of the Flexible Mobile Display in Mobile Devices:

In view of the discussion provided above with respect to FIG. 1 through FIG. 8, it should be clear that the Flexible Mobile Display can be implemented in a wide variety of form factors and sizes for use with a wide variety of mobile or electronic devices. Examples of devices with which the Flexible Mobile Display is operable include, but are not limited to: portable or mobile communications devices or cell phones, mobile gaming devices, mobile computing devices, eBooks, eReaders, remote control devices, wrist watches, children's toys, or any other stationary, portable or mobile computing device for which an extensible display would be useful.

FIG. 9 and FIG. 10 illustrate simple examples of mobile devices within which the Flexible Mobile Display can be implemented. Again, these figures are provided as examples only, and are not intended to limit the use or scope of the Flexible Mobile Display described herein.

For example, FIG. 9 illustrates a portable communications device 900, such as cell phone. In this example, a foldable embodiment of the Flexible Mobile Display 910 (having a footprint indicated by the broken line) such as that illustrated by FIG. 4 is coupled or integrated into the portable communications device. Clearly, there are a number of ways in which the Flexible Mobile Display 910 can be integrated into the portable communications device 900. One example is to mount or attach the Flexible Mobile Display 910 to the bottom of the portable communications device 900, and then to extend the Flexible Mobile Display for use by pulling on the pull handle 400 or tab as described with respect to FIG. 4. Another way to provide the Flexible Mobile Display 910 within the portable communications device 500 is to construct the portable communications device as a type of clamshell device that opens to expose the internal Flexible Mobile Display 910, which is then extended for use by pulling on the pull handle 400 or tab as described with respect to FIG. 4.

FIG. 10 provides a similar example to that of FIG. 9. However, in the example of FIG. 10, a rollable embodiment of the Flexible Mobile Display 1010 is coupled to one side of a portable electronic device 1000, such as a gaming control or the like. In this example, the Flexible Mobile Display 1010 is extended for use by pulling on the pull handle 400 or tab as described with respect to FIG. 5. Pulling on the pull handle 400 opens the Flexible Mobile Display 1010 while extending the extensible support rods 410 and unrolling the multi-layer passive display as discussed with respect to FIG. 5.

In general, there is no need to tie the Flexible Mobile Display to a particular device. In fact, the Flexible Mobile Display can be constructed in a self-contained format as a standalone display device, similar to a computer monitor, that requires only a video signal input and a power source to operate. Consequently, it should be clear that Flexible Mobile Display can be constructed in various form factors, such as illustrated by FIG. 11, in a standalone embodiment. For example, FIG. 11 illustrates a standalone rollable embodiment of the Flexible Mobile Display wherein a pull handle or tab 1100 is used to extend a spring-loaded rollable embodiment of the multi-layer passive display 1110 from a housing, such as, for example, a storage tube 1130 or the like. In this embodiment rigid or semi-rigid support rods 1115 are locked into place after the multi-layer passive display 1110 is extended to hold the multi-layer passive display in position during use, though the aforementioned extensible rods may also be used, if desired. These support rods 1115 are then removed to allow the multi-layer passive display 710 to be retracted back into the storage tube 1130 when not in use.

Like each of the aforementioned embodiments, the standalone embodiment of the Flexible Mobile Display includes a micro or pico projector 1120. In addition, similar to various embodiments discussed above, this embodiment of the Flexible Mobile Display may also include an optional camera 1150 and/or an optional infrared detector 1160. However, in contrast to the previously described embodiments, this standalone embodiment of the Flexible Mobile Display also includes a video/data IO port 1140 for receiving/sending video and/or touch or camera data and a power port 1145 for receiving power for the projector 1120, camera 1150 and infrared detector 1160.

2.4 Optional Directional Light Rejection and Optical Gain:

In various embodiments, the optics within the flexible multi-layer display are designed to address several parameters including rejecting ambient light and directing the projector output light appropriately by both redirecting the light and limiting the viewing angle to passively produce a directional gain, thereby improving contrast levels without requiring an increase in projector energy expenditures.

Ambient light rejection can be achieved in two ways: the "Venetian blind" method and the micro-lens array method. In the Venetian blind method, the rear surface of the screen is embedded with hollow pillars that are pointing at the projector. The outer surfaces of the pillars are light absorbing. The projector light, entering at the same angle as the hollow pillars, simply passes through the hollow centers of the pillars unimpeded, while ambient light at angles differing from light from the projector is absorbed by the outer surfaces of the pillars. In the micro-lens array method, the projector light first encounters a micro-lens array (note that micro-mirrors, micro prisms, Fresnel lenses, etc. can also be used for this purpose, depending upon the overall geometry and thickness of the Flexible Mobile Display) and gets focused on the focus plane. If the focal points of the focus plane are made transparent while the rest of the focus plane is made black or opaque (such as by photo-etching the focus plane after exposure to the light from the projector, as discussed above), then significant ambient light rejection can be also achieved. Note that these two methods can be combined to give better ambient light rejection than either one alone. Also, the micro-lens (or micro-mirror) array, because of the focusing action, can be used to adjust the viewing angle.

Directing the output light from the projector appropriately consists of two parts: viewing angle adjustment and redirecting the light in viewer's direction. View angle adjustment can be done with a micro-lens, micro-prism, or a micro-mirror array as discussed in terms of the aforementioned optional light redirection layer (see FIG. 2 and FIG. 3, and the associated discussion above, and FIG. 12 and the associated discussion below). Alternatively, a weak diffuser, typically after light redirection by the optional light redirection layer, can also be used to adjust the viewing angle.

Using the light rejection and direction techniques discussed above, the Flexible Mobile Display can be implemented in a variety of formats having different complexity and performance levels.

For example, if the Venetian blind method is used, the multi-layer passive display can have layers that, starting from the rear side (where light from the projector first arrives), include a Venetian blind layer for ambient light rejection, a micro-prism or micro-mirror layer for redirection (i.e., the aforementioned "light redirection layer"), followed by a micro-lens array or weak diffuser (i.e., the aforementioned "focusing layer"). In some cases, if a micro-mirror array or various types of micro-lens arrays are used for light redirection (i.e., the aforementioned "light redirection layer"), the focusing layer can be removed, assuming the micro-mirrors or micro-lenses of the light redirection layer have adequate optical power (focusing capability) to produce the required viewing angle. Note that this is an example of the aforementioned case where the light redirection layer and the focusing layer are basically combined into a single layer, as discussed above in Section 1.0. Alternatively, a Venetian blind layer, followed by a micro-lens array with optional additional ambient light rejection (i.e., the aforementioned "focusing layer"), and finally a micro-prism or micro-mirror layer for light redirection (i.e., the aforementioned "light redirection layer"). In other words, depending upon the geometry, the focusing layer and the light redirection layer can be reversed in the optical path. Note that FIG. 14 and FIG. 16, discussed below, illustrate abstract examples of this type of layer reversal.

Alternately, if the micro-lens array method is used for rejection or absorption of ambient light, the multi-layer passive display can be formed by using, starting from the rear side, a micro-lens or a micro-mirror array layer (or a Fresnel lens layer) and a light redirection layer with a micro-prism or micro-mirror array. If the first layer is a micro-mirror layer, then the second layer may be unnecessary, again, depending upon the geometry and optical characteristics of that layer.

Figure 12:
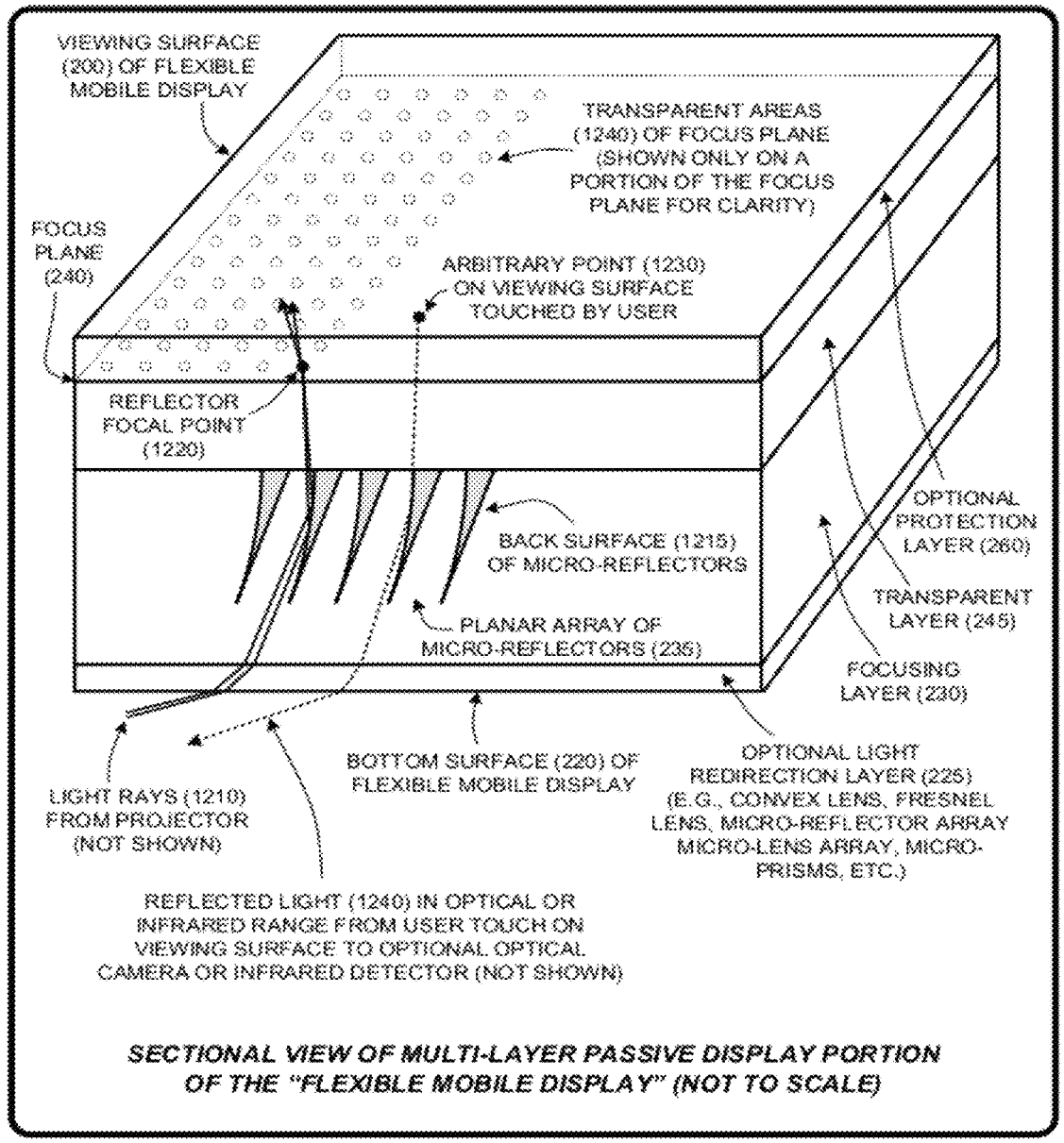
FIG. 12 illustrates an abstract sectional view of the flexible multi-layer display portion of the Flexible Mobile Display, as described herein.

When the geometry allows it, the simplest structure for the multi-layer passive display uses only a single micro-mirror array (i.e., the aforementioned "focusing layer"), without any additional micro-lens or micro-prism array (i.e., the aforementioned "light redirection layer"), and without a Venetian blind layer. In this case, the simplest embodiment of the multi-layer passive display portion of the Flexible Mobile Display includes only a focusing layer and a focus plane, with a possible transparent layer between the focus plane and the focusing layer, depending upon the geometry. FIG. 12, discussed in detail in Section 2.5 shows an example of this minimum configuration of the Flexible Mobile Display.

2.5 Operational Discussion of the Flexible Mobile Display:

As illustrated by FIG. 12, light rays 1210 from the projector (not shown) first hit the bottom surface 220 of the Flexible Mobile Display. In various embodiments, this bottom surface 220 (which is the backside surface of the screen for the user) may be anti-reflection treated using conventional techniques to improve light absorption and/or transmission, as discussed above in Section 2.4. Note also that the bottom surface can be implemented as a transparent protective film, if desired. After transiting through the optional light redirection layer 225, the incoming light rays 1210 are refracted or redirected to an angle that is better suited to the reflectors or lenses in the planar array of micro-reflectors 235.

Once the light rays 1210 impinge on the reflective surface of the array of micro-reflectors 235 in the focusing layer 230, as described above, those micro-reflectors focus and redirect the rays upward through internal reflection towards the focus plane 240. In various embodiments, a back surface 1215 of the micro-reflectors are coated with a non-reflective coating, or are otherwise made non-reflective using various conventional techniques. By making the back surface 1215 of the micro-reflectors non-reflective, light from unwanted sources or directions can be further reduced or eliminated. Whether or not the back surface 1215 of the micro-reflectors are made non-reflective, the light rays 1210 from the projector are focused on particular focal points 1220 on the focus plane 240 by the micro-reflectors 135. Before reaching the focal points 820 after reflection by the micro-reflectors 135, light rays pass through the transparent layer 145, which, if used, is provided simply to space the focus plane 140 far enough from the micro-reflectors that the focal points of the micro-reflectors coincide with the transparent regions of the focus plane.

Note that each of the focal points 1220 represents a transparent area 1240 of the focus plane 240. Note also that the focus plane 240 illustrated in FIG. 12 shows these transparent areas 1240 on only a limited portion of the focus plane for purposes of clarity. Further, it should also be understood that although these transparent areas 1240 are illustrated in a rectilinear pattern, the actual pattern or arrangement of the focal points 1220 is dependent upon the geometry of the preceding layers of the Flexible Mobile Display. In particular, as discussed below, the self-aligned lithography process used to clear transparent regions for the focal points from the otherwise opaque focus plane ensure that those points correspond to whatever geometry results from the configuration and geometry of the focusing layer 230. For example, in the case that a Fresnel lens is used in the light redirection layer 225 or the focusing layer 230, the resulting focus plane may have concentric rings of transparent focal points 1220.

In particular, as discussed above, the focus plane 240 is transparent for the focal points and black or opaque for other regions. These opaque and transparent regions are formed by applying self-aligned lithography techniques (e.g., photo-etching) to an initially opaque focus plane 240, as discussed below. Specifically, the opaque and transparent regions of the focus plane 240 are created by placing a light source (e.g., optical or laser) at or near the location where the projector would be when construction of the Flexible Mobile Display is complete. The focus plane 240 is coated with light-sensitive material and the opaque and transparent regions are then processed thru standard pattern developing means by exposing the coated focus layer to the light source via the optical path described above (i.e., light source to bottom surface 220 through the optional light redirection layer 225, through the focusing layer, and then through the transparent layer 245 to the resulting focal points 1220 on the focus plane 240.

As discussed above, the focus plane 240 may be coated with the optional protection layer 260, which in turn may be anti-reflection treated, if desired. As noted above, the whole screen thickness is on the order of about 50 to 250 microns.

The above-described embodiments offer several advantages. For example, rejection of ambient light through the opaque/transparent patterning of the focus plane which accepts only light coming from the pico projector for output to the front of the screen improves the overall contrast of the projected image, thus reducing power requirements of the projector in achieving acceptable contrast levels. Another advantage is that critical optical surfaces (e.g., the optional light redirection layer and the focusing layer) are protected by being "inside" the screen, with the outside surfaces of the screen being just simple smooth surfaces (or the optional protective layers or films discussed above). Finally, because the optical path is reversible, objects (including fingers, styluses, etc.) touching the front of the screen can reflect light (in visual or infrared wavelengths) back towards the pico projector or an infrared or optical camera positioned sufficiently near the projector to capture the reflected light. The result of processing light traveling this reverse optical path is that highly accurate and sensitive touch sensors can be included the Flexible Mobile Display, without requiring any electronics in any layer or surface of the flexible multi-layer display portion of the Flexible Mobile Display. A simple example of this concept is that an arbitrary point 1230 on the viewing surface 200 that is touched by a user can reflect visual or infrared light 1240 along the reverse optical path of light from the projector to an optional optical camera or infrared detector (not shown). Note that the position of that arbitrary point 1230 is detectable with sufficient precision to enable highly accurate touch-based user interfaces that do not interfere with any images being projected onto the Flexible Mobile Display.

Figure 13:
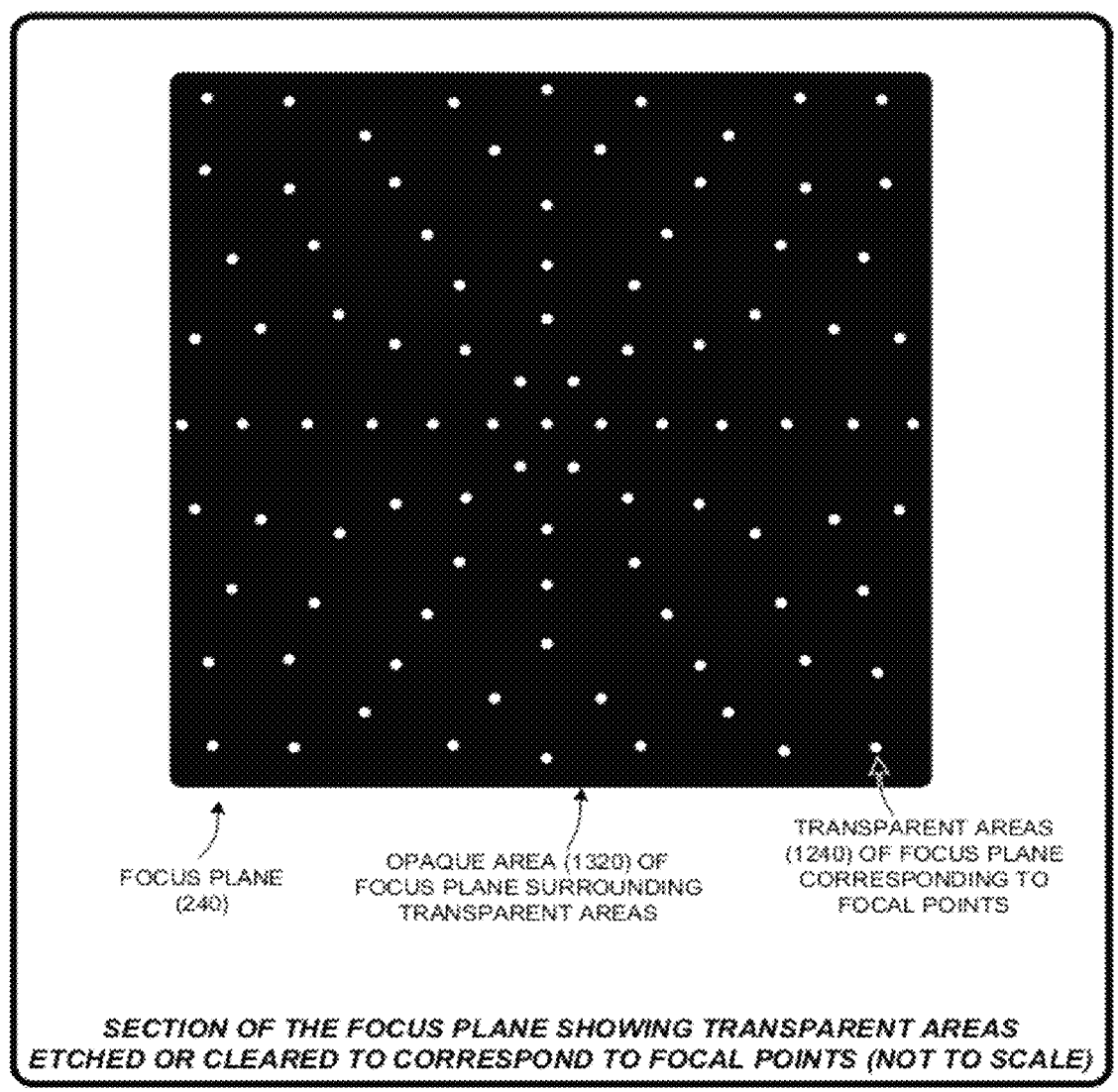
FIG. 13 illustrates a focus plane portion of the flexible multi-layer display portion of the Flexible Mobile Display, as described herein.

2.5.1 Focus Plane:

In view of the preceding discussion, it should be clear that the focus plane comprises a planar region of transparent focal points surrounded by an opaque region. FIG. 13 illustrates a section of the focus plane 240. As illustrated, the focus plane includes a plurality of transparent areas 1240 that correspond to the focal points of the reflectors or lenses within the aforementioned focusing layer of the multi-layer display portion of the Flexible Mobile Display. An opaque area 1320 surrounds the transparent areas 1240 of the focus plane 240. As discussed above, the resolution of the focus plane (i.e., the spacing of the transparent regions) is on the order of about 250 DPI for various embodiments of the Flexible Mobile Display, though in practice, this resolution will be related to the geometry of the various layers of the multi-layer display portion of the Flexible Mobile Display, as discussed above.

One advantage of the construction process of the Flexible Mobile Display described herein is that alignment of the transparent areas 1240 of the focal plane 240 to the focal points of the focusing layer is achieved after various layers of the multi-layer display portion of the Flexible Mobile Display are joined or bonded together. In particular, as noted above, photo-etching (e.g., photo-lithography) of the focus plane is performed after the focus plane is bonded to the preceding layers (i.e., the transparent layer, the focusing layer, and the optional light redirection layer) of the multi-layer display portion of the Flexible Mobile Display by exposing the multi-layer display portion of the Flexible Mobile Display to light from a light source or laser from the approximate position where the pico-projector is to be placed. This ensures that each of the transparent areas 1240 of the focus plane 240 exactly match a corresponding focal point from one (or more) of the micro-reflectors or lenses in the focusing layer. Further, since the remainder of the focus plane 240 is opaque, contrast of the image projected though the focal plane by the pico-projector is significantly improved.

2.6 Exemplary Touch-Based Interfaces:

As discussed above, in various embodiments, the Flexible Mobile Display includes touch-sensing capabilities for implementing touch and/or multi-touch-based user interfaces on the same surface of the Flexible Mobile Display that displays images and/or videos. Further, these touch sensing capabilities can operate concurrently with the projection of images and/or videos on the multi-layer display portion of the Flexible Mobile Display.

In various embodiments, these touch sensing capabilities are implemented in a variety of different ways. For example, as noted above, the reverse optical path of light from the projector is available to determine whether (and where) the user has touched the upper surface of the multi-layer display portion of the Flexible Mobile Display. As noted above, this determination is made by evaluating light or infrared rays traveling along the reverse optical path to a camera or infrared detector in response to light reflected from a user finger or touch device (e.g., a stylus or the like) touching, or in close proximity to, the surface of the multi-layer display portion of the Flexible Mobile Display.

Resolution of the optical or infrared-based touch sensing capability can be as high as the resolution of the focus plane (e.g., on the order of about 250 DPI) by using the camera or infrared detector to map specific touch locations and/or specific multi-touch patterns. Once the reflected light or infrared is received and mapped by software associated with the camera or infrared detector, then that information is passed to a conventional touch-based processing mechanism that performs whatever action is appropriate in response to any particular touch event. In this way, the optical or infrared embodiments of the touch-based interface appears to the user to function in the same manner as a typical capacitive touch-based interface, such as those seen on the screens or displays of many conventional "smart phones" or the like.

In fact, in various embodiments, a transparent capacitive-touch type layer can be added to the surface of the multi-layer display portion of the Flexible Mobile Display in order to provide a conventional capacitive touch-based interface to the Flexible Mobile Display. Note that this type of capacitive layer would use conventional interface techniques to provide the Flexible Mobile Display with a capacitive touch or multi-touch based interface.

Figure 14:
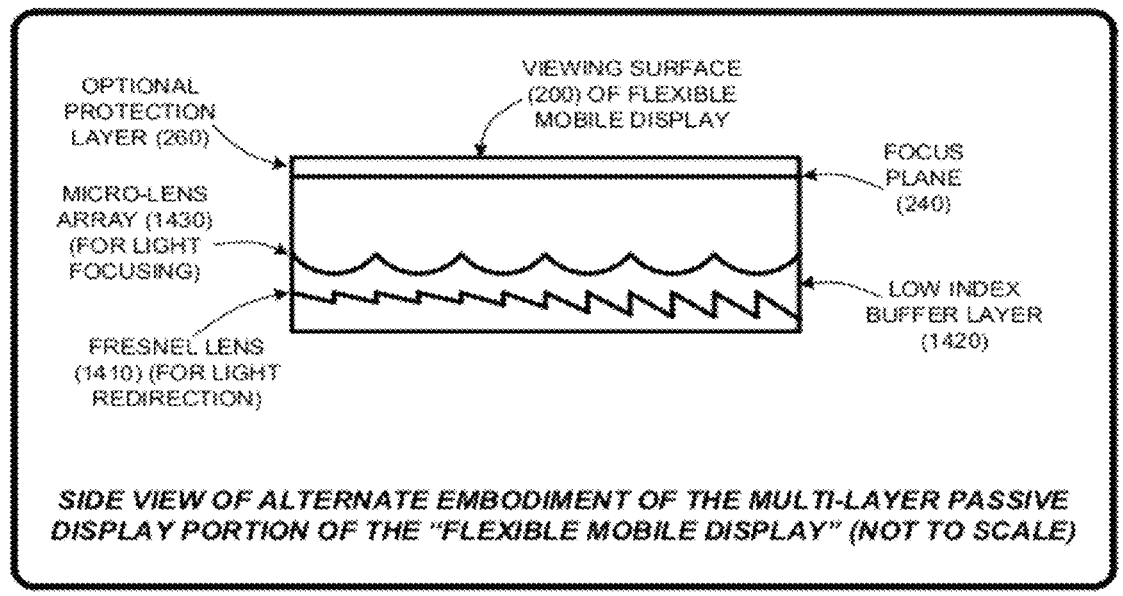
FIG. 14 illustrates an abstract cross-sectional side view of an alternate embodiment of the flexible multi-layer display portion of the "Flexible Mobile Display," showing a Fresnel lens in combination with micro-lens array based implementation, as described herein.
Figure 15:
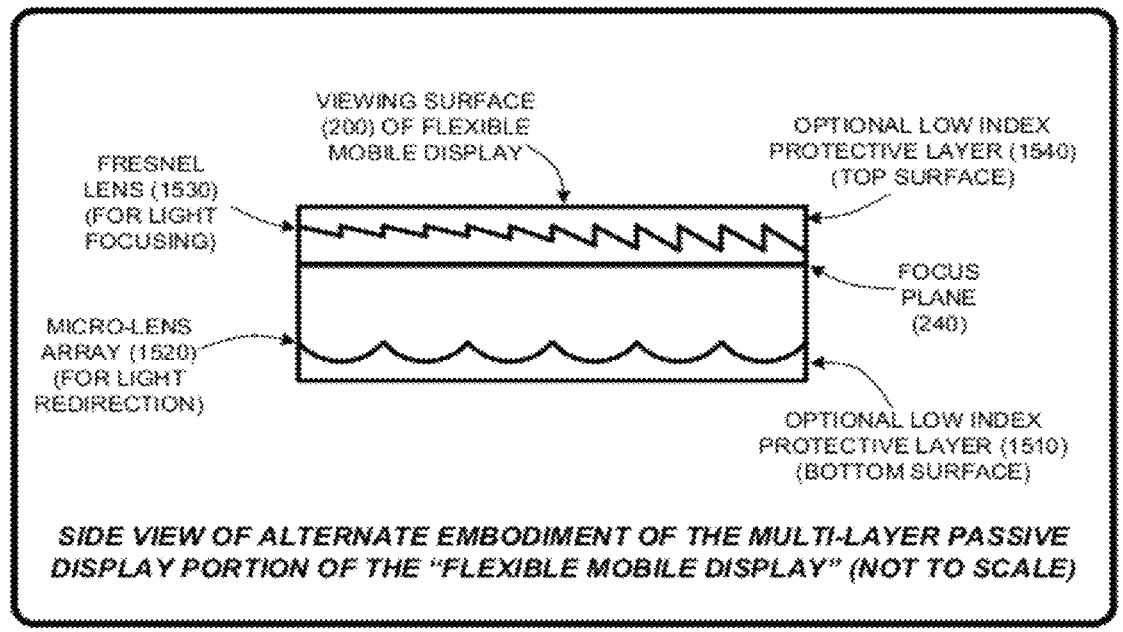
FIG. 15 illustrates an abstract cross-sectional side view of an alternate embodiment of the flexible multi-layer display portion of the "Flexible Mobile Display," showing a Fresnel lens in combination with micro-lens array based implementation, as described herein.
Figure 16:
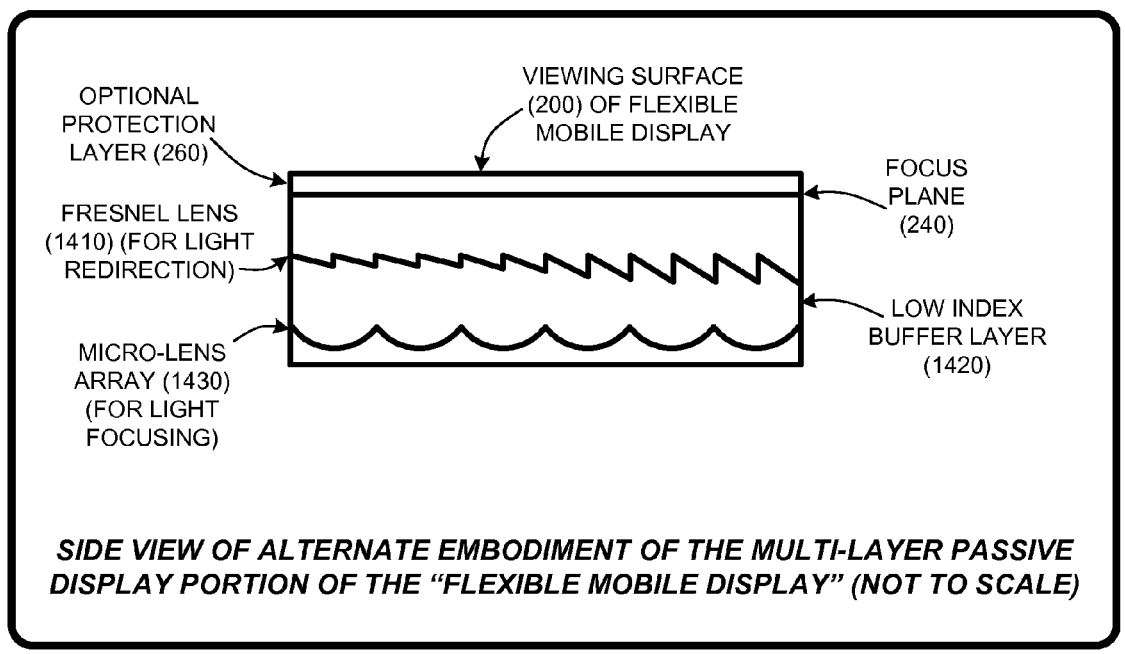
FIG. 16 illustrates an abstract cross-sectional side view of an alternate embodiment of the flexible multi-layer display portion of the "Flexible Mobile Display," showing a reversal of the light focusing layer and the light redirection layers of FIG. 14, as described herein.

2.7 Alternate Implementations of the Flexible Mobile Display:

FIG. 14 through FIG. 16 provide abstract cross-sectional side views of alternate embodiments of the flexible multi-layer display portion of the "Flexible Mobile Display". In general, FIG. 14 through FIG. 16 show alternate embodiments that each use a Fresnel lens in combination with micro-lens array. However, the arrangement and use of these elements are significantly different between the embodiments illustrated.

In particular, FIG. 14 illustrates an abstract cross-sectional side view of an embodiment of the flexible multi-layer display portion of the Flexible Mobile Display, showing a Fresnel lens 1410 for implementing the optional light redirection layer in combination with a low index of refraction transparent buffer layer 1420, that together redirect the incoming light from the projector towards a focusing layer that includes a micro-lens array 1430. As described above with respect to various embodiments, this micro-lens array 1430 then reflects or focuses the incoming light through the focus plane 240 and the optional protection layer 260 such that the light from the projector is visible to the user on the viewing surface 200 of the Flexible Mobile Display.

Interestingly, FIG. 15 shows an embodiment of the Flexible Mobile Display where a Fresnel lens 1530 and a micro-lens array 1520 perform a reversal of the functions described for similar elements with respect to FIG. 14. In particular, FIG. 15 illustrates an abstract cross-sectional side view of an embodiment of the flexible multi-layer display portion of the Flexible Mobile Display, showing a micro-lens array 1520 in combination with an optional low index of refraction protective layer 1510 covering the bottom surface for implementing the optional light redirection layer. Together the micro-lens array 1520 and the protective layer 1510 redirect the incoming light from the projector towards the focus plane 240. Light exiting the focus plane 240 is then focused by a Fresnel lens 1530 through an optional low index of refraction protective layer 1540 onto the viewing surface 200 of the Flexible Mobile Display.

FIG. 16 illustrates an abstract cross-sectional side view of an alternate embodiment of the flexible multi-layer display portion of the "Flexible Mobile Display," showing a simple reversal of the light focusing layer and the light redirection layers of FIG. 14. In particular, FIG. 16 illustrates an abstract cross-sectional side view of an embodiment of the flexible multi-layer display portion of the Flexible Mobile Display, showing the focusing layer that includes a micro-lens array 1430 in combination with the Fresnel lens 1410 for implementing the optional light redirection layer in combination with the low index of refraction transparent buffer layer 1420, that together redirect the incoming light from the projector. As described above with respect to various embodiments, this combination of lenses reflects or focuses the incoming light through the focus plane 240 and the optional protection layer 260 such that the light from the projector is visible to the user on the viewing surface 200 of the Flexible Mobile Display.

In view of the alternate embodiments described with respect to FIG. 14 through FIG. 16, and in further view of the various embodiments described throughout this document, it should be clear that the flexible multi-layer display portion of the Flexible Mobile Display can be constructed in a variety of ways that use various components (e.g., lenses, prisms, reflective materials, refractive materials, light absorptive materials, etc.) to form the various layers (e.g., light redirection layer, focusing layer, and focus plane) of that display along with optional protective layers on either surface of the display.

The foregoing description of the Flexible Mobile Display has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate embodiments may be used in any combination desired to form additional hybrid embodiments of the Flexible Mobile Display. It is intended that the scope of the invention be limited not by this detailed description, but rather by the claims appended hereto.

What is claimed is:

1. A portable display device, comprising:
a pico-projector positioned relative to a transparent bottom surface of a multilayer display so as to project onto the transparent bottom surface of the multilayer display;
wherein the multilayer display includes a focusing layer and a light redirection layer comprising a composite bottom layer of the multilayer display and a focus plane comprising a top layer of the multilayer display;
wherein the focus plane comprises a planar region of transparent regions surrounded by an opaque region;
wherein the composite bottom layer of the multi-layer display focuses and directs incoming light rays striking the transparent bottom surface of the multilayer display from the pico-projector to corresponding transparent regions of the focus plane, thereby causing the projection of the pico-projector from the bottom of the multi-layer display to appear on the top of the multilayer display through the transparent regions of the focus plane; and
a transparent layer disposed between the focus plane and composite bottom layer to space micro-reflectors within the focusing layer at a distance from the focus plane that is sufficient to ensure that focal points of each micro-reflector coincide with the transparent regions of the focus plane.

2. The portable display device of clam 1 wherein the multilayer display is foldable.

3. The portable display device of clam 1 wherein the multilayer display is rollable.

4. The portable display of claim 3 wherein the rollable multilayer display is coupled to a portable computing device.

5. The portable display device of clam 1 wherein the pico-projector is a short-throw projector.

6. The portable display of claim 1 wherein self-alignment optical etching is used to create the transparent regions of the focus plane, such that those transparent regions are aligned to focal points of an array of micro-reflectors within the focusing layer.

7. The portable display of claim 1 further comprising a transparent protective layer disposed on top of the focus plane.

8. The portable display of claim 1 further comprising a transparent protective layer disposed on the transparent bottom surface of the multilayer display.

9. The portable display device of claim 1 wherein the portable display device is coupled to a mobile computing device, and wherein the portable display device is user extensible and user retractable.

10. The portable display device of claim 1 further comprising a camera positioned relative to the pico-projector so as to capture light rays traveling a reverse of an optical path through the multilayer display as that of light rays from the projection of the pico-projector.

11. The portable display device of claim 10 further comprising a touch-based user interface wherein the camera is used to track any user touch on the top of the multilayer display via corresponding light rays traveling the reverse of the optical path.

12. The portable display device of claim 1 wherein the multilayer display is passive, having no moving parts and no electronic components.

13. A method for constructing a passive multilayer display, comprising steps for:
   bonding a focusing layer comprising a bottom layer of a rollable passive multilayer display to a bottom surface of a light redirection layer of the passive multilayer display;
   bonding an opaque focus plane to a top surface of the light redirection layer; and
   using a light source positioned to project light onto a bottom surface of the focusing layer, said projected light being focused by the focusing layer into the light redirection layer, and said light being further directed by the light redirection layer to focal points coinciding with locations on the opaque focus plane, said light then being used to construct transparent regions on the opaque focus plane by photo-etching the focus plane at the locations coinciding to the focal points.

14. The method of claim 13 further comprising steps for positioning a short-throw projector in place of the light source to project video onto the bottom surface of the focusing layer, and wherein the projected video is visible on a top surface of the passive multilayer display through the transparent regions of the focus plane.

15. The method of claim 14 further comprising steps for:
   positioning a camera relative to the projector so as to capture light rays traveling a reverse of an optical path through the passive multilayer display as that of light rays from the projection of the projector; and
   implementing a touch-based user interface on a top surface of the passive multilayer display by using the camera to track any user touch on the top surface of the passive multilayer display via corresponding light rays traveling the reverse of the optical path.

16. The method of claim 13 wherein the rollable passive multilayer display is extensible from within a housing.

17. The method of claim 13 wherein the passive multilayer display is foldable without damaging optical characteristics of the passive multilayer display.

18. A mobile computing device having a user extensible display, comprising:
   a multilayer flexible display disposed within a mobile computing device by rolling the multilayer flexible display onto a spring-loaded rod within the mobile computing device;
   wherein a bottom layer of the multilayer flexible display comprises a light redirection layer;
   wherein a middle layer of the multilayer flexible display comprises a focusing layer bonded to a top surface of the light redirection layer;
   wherein a top layer of the multilayer flexible display comprises a focus plane bonded to a top surface of the focusing layer; and
   a projector disposed within the mobile computing device, wherein the projector projects video onto the bottom surface of the light redirection layer that directs light of the projected video onto micro-reflectors of a planar array of micro-reflectors within the focusing layer which then reflect the projection through transparent focal points of the focus plane to be visible on the top layer of the multilayer flexible display when the multilayer flexible display is extended from within the mobile computing device.

19. The mobile computing device of claim 18 further comprising a camera positioned relative to the projector so as to capture light rays traveling in an opposite direction of an optical path through the multilayer flexible display than that of light rays from the projector.

20. The mobile computing device of claim 18 wherein the multilayer flexible display is disposed within the mobile computing device by folding the multilayer flexible display onto a user extensible frame within the mobile computing device that expands the multilayer flexible display into a flat condition when the multilayer flexible display is extended from within the mobile computing device.

* * * * *